United States Patent [19]
Takeda et al.

[11] Patent Number: 5,522,018
[45] Date of Patent: May 28, 1996

[54] SORTING PROCESSING SYSTEM AND IMAGE SYNTHESIZING SYSTEM USING THE SAME

[75] Inventors: Masaki Takeda, Tokyo; Komei Kato, Yokohama, both of Japan

[73] Assignee: Namco Ltd., Tokyo, Japan

[21] Appl. No.: 174,371

[22] Filed: Dec. 28, 1993

[30] Foreign Application Priority Data

Dec. 29, 1992 [JP] Japan .................................. 4-360425

[51] Int. Cl.⁶ ...................................................... G06F 15/62
[52] U.S. Cl. ............................................................. 395/122
[58] Field of Search .................................. 395/141, 133, 395/122, 121; 345/113, 114, 118

[56] References Cited

U.S. PATENT DOCUMENTS 5,179,717  1/1993  Sato et al. ................................ 395/800
5,335,319  8/1994  Obata ....................................... 395/141

OTHER PUBLICATIONS

"Hidden Surface Removal Algorithm" in *Johoshori* (Information Processing), published by Information Processing Society of Japan, vol. 24, No. 4, 1983, pp. 539–546.

*Primary Examiner*—Phu K. Nguyen
*Attorney, Agent, or Firm*—Oliff & Berridge

[57] ABSTRACT

A sorting processing system most suitable for use in an image synthesizing system processing images in real time is provided. A Z-representative value computing unit computes a Z-representative value from the Z-coordinate values of the respective vertices in a polygon which are inputted from a 3-D computing unit. The Z-representative value is inputted into a polygon shift value adder unit or polygon fixed Z-value setting unit to perform the addition of shift value or the setting of fixed Z-value for every polygon. An object shift value adder unit and object fixed Z-value setting unit perform the addition of shift value and the setting of fixed Z-value for every 3-D object. On the other hand, an absolute priority setting unit sets an absolute priority bit to which a shift value is added by polygon and object absolute priority shifting units for every polygon and 3-D object. A sorting Z-value is formed from the above computation results and then inputted into a sorting unit. According the priority determined by this sorting Z-value, the polygon image data is outputted toward an image supply unit.

31 Claims, 21 Drawing Sheets

FIG. 9A

| FRAME DATA | OBJECT DATA | POLYGON DATA | POLYGON DATA | — — | OBJECT DATA | POLYGON DATA | POLYGON DATA | — — | FRAME DATA | OBJECT DATA | POLYGON DATA |

- OBJECT 1, OBJECT 2 (FIRST FRAME); SECOND FRAME

FIG. 9B

| HEADER | REPRESENTATIVE VALUE SETTING DATA | SORTING CONTROL DATA | $I_0$ | $I_1$ | $I_2$ | $I_3$ | $T_{X0}$ | $T_{Y0}$ | $T_{X1}$ | $T_{Y1}$ | $T_{X2}$ | $T_{Y2}$ | $T_{X3}$ | $T_{Y3}$ | $X_0$ | $Y_0$ | $Z_0$ | $X_1$ | $Y_1$ | $Z_1$ | $X_2$ | $Y_2$ | $Z_2$ | $X_3$ | $Y_3$ | $Z_3$ |

BRIGHTNESS DATA OF VERTICES; TEXTURE COORDINATES OF VERTICES; COORDINATES OF VERTICES

FIG. 10A SORTING CONTROL DATA FOR SHIFT VALUE ADDITION

| 21 20 | 18 17 | 0 |
|---|---|---|
| 0 | ABSOLUTE PRIORITY SHIFT VALUE | Z SHIFT VALUE (SIGNED 18 BITS) |

FIG. 10B SORTING CONTROL DATA FOR FIXED Z-VALUE SETTING

| 21 20 | 0 |
|---|---|
| 1 | FIXED Z-VALUE (21 BITS) |

FIG. 10C SORTING Z-VALUE

| 23 | 21 20 | 0 |
|---|---|---|
| 3 BITS | LOW-ORDER PART OF SORTING Z-VALUE (21 BITS) | |

ABSOLUTE PRIORITY PART

FIG. 16A

| POLYGON DATA | X(1) | X(2) | X(3) | X(4) | X(5) | X(6) | X(7) | X(8) | X(9) | X(10) |
|---|---|---|---|---|---|---|---|---|---|---|
| SORTING Z-VALUE | 4 | 2 | 9 | 3 | 6 | 7 | 4 | 9 | 5 | 0 |
| POLYGON DATA | X(11) | X(12) | X(13) | X(14) | X(15) | X(16) | X(17) | X(18) | X(19) | X(20) |
| SORTING Z-VALUE | 6 | 7 | 5 | 6 | 10 | 3 | 6 | 4 | 1 | 7 |

FIG. 16B

| SORTING Z-VALUE | 10 | 9 | 8 | 7 | 6 | 5 | 4 | 3 | 2 | 1 | 0 |
|---|---|---|---|---|---|---|---|---|---|---|---|
| FREQUENCY | 1 | 2 | 0 | 3 | 4 | 2 | 3 | 2 | 1 | 1 | 1 |

FIG. 16C

| SORTING Z-VALUE | 10 | 9 | 8 | 7 | 6 | 5 | 4 | 3 | 2 | 1 | 0 |
|---|---|---|---|---|---|---|---|---|---|---|---|
| PRIORITY | 1 | 2 | x | 4 | 7 | 11 | 13 | 16 | 18 | 19 | 20 |

(INITIAL STATE)

(DRAW X)

(DRAW Y)

SORTING PROCESSING SYSTEM AND IMAGE SYNTHESIZING SYSTEM USING THE SAME

TECHNICAL BACKGROUND

1. Field of the Invention

The present invention relates to a system for sorting image data in real time and an image synthesizing system using such a sorting processing system.

2. Description of the Related Art

Such an image synthesizing system as shown in FIG. 18 has been used, for example, in pseudo 3-D video games, a flight simulator, or other driving simulators. The image synthesizing system has previously stored image data relating to a 3-D object 300. If the image synthesizing system is used in a driving game, the 3-D object is in the form of a racing car. The image synthesizing system also forms a variety of other 3-D objects which are roads, houses and other background images disposed in a 3-D space.

When a player 302 operates a handle or other tool on a player's control panel 304 to rotate or translate the 3-D object or racing car 300, the image synthesizing system responds to operation signals to compute information of images after the rotation or translation of the 3-D object 300 in real time. The computed images are then projected onto a screen 306 in a perspective transformation manner. As a result, the player 302 can virtually simulate the pseudo 3-D space as he or she actually rotates or translates the 3-D object 300 in real time.

One of such image synthesizing systems is shown in FIG. 19.

Image data relating to the 3-D object 300 are represented as a polyhedron divided into 3-D polygons as shown by (1)–(6) in FIG. 18 (polygons (4)–(6) being not shown in this Figure). As shown in FIG. 19, the coordinates and associated data of vertex in each of the 3-D polygons have been stored in a 3-D data memory 314 in an image supply unit 308. The coordinates of vertices are read out by a 3-D computing unit 316. According to control signals from an operator's control unit 310 through a main CPU 312, the image synthesizing system performs the computations of rotation, translation or other motions relating to the coordinates of vertices and the transformations of coordinate such as perspective transformation or others. Thereafter, image data of polygons will be outputted through the image supply unit 308.

An image display unit 360 then responds to the polygon image data or coordinates of vertices of polygon from the image supply unit 308 to paint all the dots in the polygons with corresponding color data or other data.

If two polygons are overlapped on each other in such a painting operation, it is required that polygon parts farthest from the view point are not displayed (hidden surface removal) and that only polygon parts closest to the view point are displayed on the screen. One of such hidden surface removal techniques is known as Z-buffer technique which is described, for example, in "*Jyōhō-Shori (Information Processing)*", Vol. 24, No. 4, issued by Information Processing Society of Japan on Apr. 15, 1983.

In order to perform the hidden surface removal through the Z-buffer technique, the image synthesizing system of the prior art comprises a polygonizer 322 and a Z-buffer 324 which is disposed in the image display unit 360. The Z-buffer 324 is an image memory having a memory space which corresponds to all the dots in the displayed scene. The image memory stores Z-value (distance from the view point) of each of the dots in a corresponding polygon. FIGS. 20A and 20B show the concept of the Z-buffer technique.

As shown in FIG. 20A, 3-D polygons X and Y in 3-D objects 300 and 301 are perspectively transformed onto a screen 306. According to such a procedure as shown in FIG. 20B, Z-values of the dots in the respective polygons are written in the Z-buffer 324.

In other words, the maximum Z-value M (usually, infinite value) is written in the Z-buffer 324 as an initial value. If the polygon X is to be drawn, it is judged for each dot in that polygon whether or not the Z-value of the polygon X is smaller than the Z-value stored in the Z-buffer 324 at each dot. If it is judged that the Z-value of the polygon X is smaller than that of a dot in the Z-buffer 324, that dot is color-painted by the polygonizer 322. In addition, the Z-value stored in the Z-buffer 324 at the corresponding dot is also updated. More particularly, all the Z-values of the corresponding parts will be updated from M to X1–X12.

If the polygon Y is to be drawn, the Z-buffer 324 is referred to for all the dots to be drawn. According to the same procedure as described above, the color painting will be carried out with the updating of the Z-buffer 324. More particularly, the Z-values X7, X8, X11 and X12 are updated respectively into Y1, Y2, Y5 and Y6 while the M-values in the parts of Z-buffer over which the polygon Y is drawn are updated into Y3, Y4, Y7, Y8–Y12. In other words, the Z-values at the parts of the polygon X overlapped by those of the polygon Y will be changed to the Z-values of the polygon Y since the polygon Y is located closer to the view point than the polygon X.

In the image display unit 360, each of the polygons is color painted according to the above procedure. The painted color data is transformed into RGB data by a palette circuit 328 and displayed on a CRT 330 as images.

Such image synthesizing systems are usually required to process images in real time. Image data for one scene (two scenes according to circumstances) must be updated for every field, for example, for every 1/60 seconds. Thus, the image synthesizing system is required to have an increased image processing speed. If the image processing speed is not increased, the quality of image will be reduced. The processing part of the image synthesizing system which is most used to increase the image processing speed is one for finally painting the dots with a given color.

This is because the polygonizer 322 must perform the processing step for all the dots in the displayed scene, unlike the image supply unit 308 of FIG. 19 which is only required to process the 3-D polygon for each vertex. More particularly, if the image display is to be made on a CRT of 640×400 pixels, all the dots equal to 640×400=256,000 must have been completely painted within one field or for 1/60 seconds. It is therefore preferable that a computation used to perform such a color painting is as simple as possible, with the number of computations being as small as possible.

In the Z-buffer technique, however, the color painting must be carried out by referring to the Z-buffer 324 to compare the Z-values at the respective dots with those stored in the Z-buffer, the comparison results being written in the Z-buffer. The computation used to make the color painting becomes a burden on the image synthesizing system. Therefore, the Z-buffer technique is unsuitable for use in performing the hidden surface removal in the image synthesizing system which should process high-quality images in real time.

SUMMARY OF THE INVENTION

In view of the aforementioned problems of the prior art, it is an object of the present invention to provide a sorting processing system and an image synthesizing system using the sorting processing system, which are particularly suitable for use in processing images in real time.

To this end, the present invention provides a sorting processing system for receiving image data relating to a plurality of polygons defining a pseudo 3-D image, sorting the image data of said polygons based on Z-coordinates which indicate the position of vertices of said polygons in the direction of view point, and for outputting the sorted image data. The system is improved by the addition of a sorting Z-value setting unit for computing a Z-representative value from the Z-coordinates of the vertices of each polygon and for setting the Z-representative value for every polygon as a sorting Z-value.

A sorting unit permutates and outputs the polygon image data according to the priority defined by the sorting Z-value.

The sorting Z-value setting unit computes the Z-representative value from the Z-coordinates at the vertices in each polygon using a representative value setting pattern which has been previously specified at each polygon for setting the Z-representative value corresponding to the characteristics of each polygon.

According to the present invention, the Z-representative value of each polygon to be processed is computed to form a sorting Z-value which can be set at each polygon. The sorting unit outputs the polygon image data according to the priority defined by the sorting Z-value. If the subsequent polygon drawing process is carried out according to the order of output, the hidden surface removal can be performed at an increased speed. The sorting processing system is most suitable for the image synthesizing system which must process images in real time. In this case, the representative value setting pattern for setting the Z-representative value corresponding to the characteristics of the polygons has been previously specified for every polygon. The Z-representative value will be computed from the Z-coordinates of vertices of the polygons, using the specified representative value setting pattern. Depending on the state of a 3-D image to be displayed, the representative value setting pattern can be changed for every polygon. Undesirable situations such as dropout of the polygon image data in the formation of image to be displayed and others can effectively be avoided. As a result, the present invention can provide a sorting processing system which can form high-quality images in real time.

The present invention also provides an image synthesizing system comprising an image supply unit for perspectively transforming a 3-D image represented by a plurality of 3-D polygons onto a 2-D plane at each of polygons corresponding to the 3-D polygons, computing the image data of polygons defining a pseudo 3-D image, and outputting the computed image data which include Z-coordinates indicating the position of vertices of said polygons in the direction of view point and data specifying a representative value setting pattern for setting a sorting Z-representative value corresponding to the characteristics of each of said polygons and a sort processing device for sequentially receiving the image data of the polygons and for sorting and outputting the polygon image data according to the Z-coordinates.

The system is improved by providing a sorting Z-value setting unit for computing a Z-representative value from the Z-coordinates of the vertices of each polygon, the Z-representative value being set at each polygon as a sorting Z-value, and A sorting unit permutates and outputs the polygon image data according to the priority defined by the sorting Z-value, The sorting Z-value setting unit computes the Z-representative value from the polygon vertex Z-coordinates, using the representative value setting pattern specified by the specifying data.

According to the present invention, the image supply unit can output the polygon image data which includes the Z-coordinates of vertices of polygons and the representative value setting pattern specifying data. The sort processing device can use the representative value setting pattern specified by the specifying data to compute the Z-representative value from the Z-coordinates, the Z-representative value being then set at each polygon as a sorting Z-value. Depending on the state of a 3-D image to be displayed, the representative value setting pattern specifying data can be changed for every polygon. Undesirable situations such as dropout of the polygon image data in the formation of image to be displayed and others can effectively be avoided. As a result, the present invention can provide a sorting processing system which can form high-quality images in real time.

The present invention is further characterized by that the representative value setting pattern used in the sorting Z-value setting unit is a pattern for selecting the Z-representative value from a group consisting of the minimum value of the Z-coordinates, the maximum value of the Z-coordinates and an average value between the minimum and maximum values; a pattern for selecting the Z-representative value from a group consisting of the maximum and average values; a pattern for selecting the Z-representative value from a group consisting of the minimum and average values; or a pattern for selecting the Z-representative value from a group consisting of the maximum and minimum values.

According to the present invention, the Z-representative value setting pattern may be a pattern for selecting the Z-representative value from a group consisting of the minimum, maximum and average values of the Z-coordinates. For the characteristics of each polygon, the Z-representative value thereof can be specified into the minimum, maximum or average value of the Z-values. In addition to the normal specification of the polygon Z-representative value into the average value, the Z-representative value of any other polygon may be specified into the minimum or maximum value depending on the state of 3-D image, for example. As a result, the Z-representative value setting pattern can more simply and effectively be set to provide the priority more efficiently.

The present invention is further characterized by that the sorting Z-value setting unit includes a shift value adder unit for adding a predetermined shift value to the computed Z-representative value at each polygon to form the sorting Z-value; for adding a predetermined shift value to each of 3-D objects defined by a plurality of polygons to form the sorting Z-value; or for adding a predetermined shift value to each polygon and also a predetermined shift value to each 3-D object to form the sorting Z-value.

According to the present invention, the sorting Z-value can be formed by adding a predetermined shift value to the Z-representative value for each polygon or for each 3-D object or for each polygon and each 3-D object. Thus, undesirable situations which could not be avoided only by changing the Z-representative value, such as dropout of the polygon image data in the formation of image to be displayed and others, can more effectively be prevented. By adding the shift value to the Z-representative value for each 3-D object, further, all the priorities of the 3-D polygons defining the 3-D object can be changed at the same time. As a result, the priority can be set more simply and efficiently.

The present invention is characterized by that the sorting Z-value setting unit includes a fixed Z-value setting unit for forming the sorting Z-value by setting the computed Z-representative value at a fixed value for every polygon or by setting the computed Z-representative value at a fixed value for every 3-D object defined by a plurality of polygons or by setting the computed Z-representative value at a fixed value for every polygon and at another fixed value for every 3-D object.

Thus, the Z-representative value can be set at a fixed value to form a sorting Z-value. In a 3-D image to be displayed, therefore, a fixed priority can be more simply set at each polygon or each 3-D object.

The present invention is further characterized by that the sorting Z-value setting unit includes an absolute priority setting unit for setting an absolute priority bit which absolutely controls the priority of each polygon independently of the value of the low order bit at the high order bit of the sorting Z-value.

The present invention can absolutely control the polygon priority independently of the value of the low order bit of the sorting Z-value since the absolute priority bit can be formed into the high order bit of the sorting Z-value. Thus, a plurality of windows can be simply formed on a displayed scene. In a driving game, for example, a plurality of images can be formed on the displayed scene as windows in the form of a rear-vision mirror, a side mirror or others which are viewed from any direction of view point. Further, priority control can be more simple since the priority can be independently controlled in each window.

The present invention is further characterized by that the sorting Z-value setting unit includes an absolute priority shifting unit for adding a predetermined shift value to the absolute priority bit for every polygon or for adding a predetermined shift value to the absolute priority bit for every 3-D object defined by a plurality of polygons or for adding a predetermined shift value to the absolute priority bit for every polygon and another predetermined shift value to the absolute priority bit for every 3-D object.

According to the present invention, the absolute priority shifting unit can add a shift value to the absolute priority bit. This means that the absolute priority bit can be changed to any value. Therefore, the priority can be controlled in a higher degree. An effective image effect which would not be provided by the prior art can be produced, for example, as an enemy character suddenly appears out of a box.

BRIEF DESCRIPTION OF THE DRAWINGS

FIG. 5A is a block diagram illustrating the first technique used in this embodiment while

FIG. 6A is a block diagram illustrating the second technique used in the present embodiment while

FIG. 7A is a block diagram illustrating the third technique used in the present embodiment while

FIGS. 9A and 9B show formats of data handled in the present embodiment.

FIGS. 10A, 10B and 10C show formats of the sorting control data and sorting Z-value.

FIG. 11A is a block diagram illustrating the layout of a sorting unit while

FIGS. 16A, 16B and 16C are tables illustrating a sorting technique which utilizes the frequency distribution.

DETAILED DESCRIPTION OF THE PREFERRED EMBODIMENT (Contents)
1. General Explanation of Image Synthesizing System
   (1) Outline,
   (2) Image Supply Unit and
   (3) Image Display Unit.
2. Explanation of Sort Processing Unit
   (1) Outline,
   (2) First Technique and Arrangement,
   (3) Second Technique and Arrangement,
   (4) Third Technique and Arrangement,
   (5) Fourth Technique and Arrangement,
   (6) Operation of Sorting Z-Value Setting Unit,
   (7) Operation of Sorting Unit and
   (8) Applicable Examples:
     (a) Change of Z-representative value;
     (b) Shift Value Addition for Each Polygon;
     (c) Shift Value Addition for Each 3-D Object;
     (d) Setting of fixed Z-Value;
     (e) Setting of Absolute Priority and
     (f) Shift Value Addition of Absolute Priority Bit.
1. General Explanation of Image Synthesizing System
   First of all, an image synthesizing system will be generally described.

(1) Outline

Figure 2:
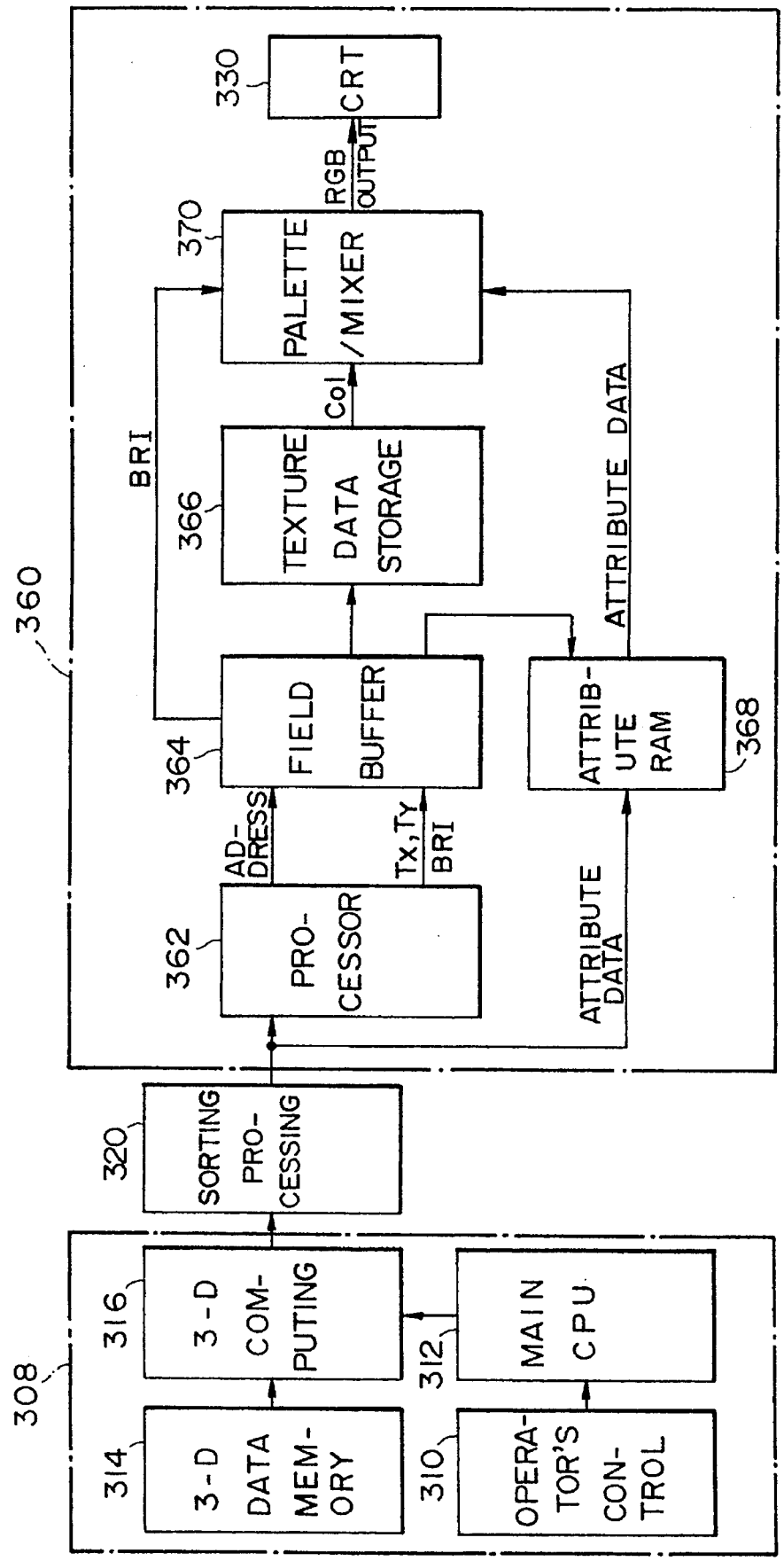
FIG. 2 is a block diagram of an image synthesizing system to which the sorting processing system of the present invention is applied.

An image synthesizing system constructed in accordance with the present invention comprises an image supply unit 308, a sorting processing unit 320 and an image display unit 360, as shown in FIG. 2.

The image supply unit 308 responds to control signals from an operator's control unit 310 to perform various treatments of coordinate change such as rotation, translation, perspective transformation and other motions and clipping for 3-D objects which have been stored in a 3-D data memory 314. The resulting image data are given to polygons on each vertex and outputted toward the sorting processing unit 320.

The sorting processing unit 320 permutates the polygon image data according to a predetermined priority, the permutated image data being then outputted toward the image display unit 360. This will further be described later.

The image display unit 360 computes the image data in each polygon from the image data given thereto on the vertices, the computed data being then outputted toward a CRT 330 on which an image is displayed.

The image synthesizing system of the present invention utilizes two techniques respectively called "texture mapping" and "Gouraud shading" to synthesize high-quality images more efficiently. The concepts of these techniques will be described briefly.

Figure 3:
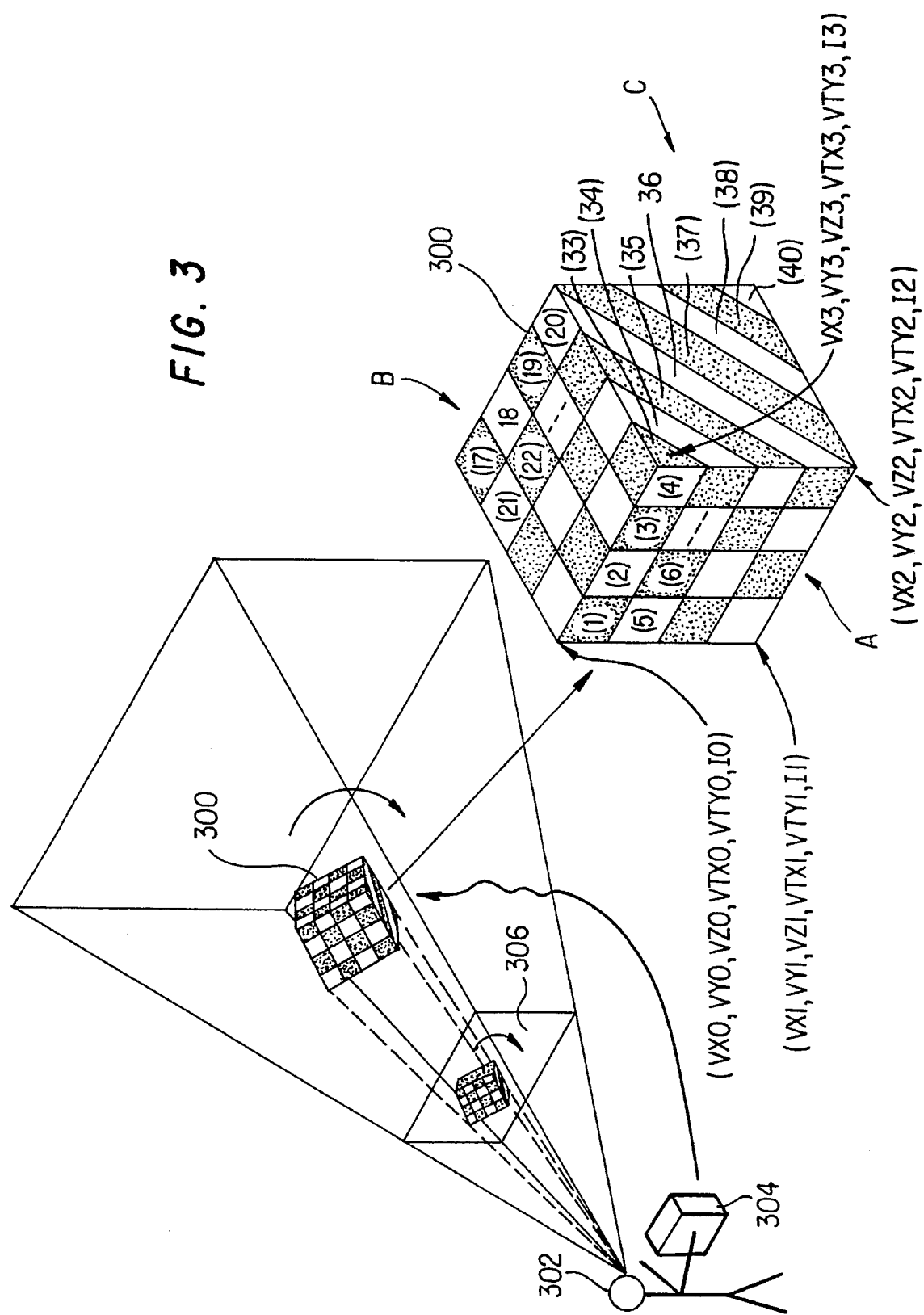
FIG. 3 is a schematic diagram illustrating the concept of the texture mapping.

FIG. 3 illustrates the concept of the texture mapping.

If it is wanted to synthesize a 3-D object 300 to which a grid-like or striped pattern is applied at each face as shown in FIG. 3, the prior art divides the 3-D object into 3-D polygons (1)–(80) (polygons (41)–(80) not shown), all of which are subjected to image treatment. This is because the image synthesizing system of the prior art can paint one polygon only with one specified color. As a result, the prior art will increase the number of polygons to synthesize a high-quality image with its complicated surface patterns. This is substantially impossible in the prior art.

In the image synthesizing system of the present invention, however, various treatments of coordinate change such as rotation, translation, perspective transformation and other motions and clipping are carried out for each of 3-D polygons A, B and C defining the faces of the 3-D object 300 (more particularly, for each vertex in the 3-D polygons). The grid-like and stripe-like patterns are handled as textures independently of the polygon treating process. More particularly, the image display unit 360 includes a texture data storage unit 366 which has stored texture data to be applied to the 3-D polygons, such as image data of the grid-like and stripe-like patterns, as shown in FIG. 2.

Addresses in the texture data storage unit 366 which can be used to specify the texture data have been given to the respective vertices of the 3-D polygons as texture coordinates of vertices VTX, VTY. More particularly, texture coordinates of vertices (VTX0, VTY0), (VTX1, VTY1), (VTX2, VTY2) and (VTX3, VTY3) are set at the respective vertices in the polygon A, as shown in FIG. 3.

The image display unit 360 determines texture coordinates TX, TY for all the dots in the polygon from these texture coordinates of vertices VTX, VTY. The determined texture coordinates TX, TY can be used to read out the corresponding texture data from the texture data storage unit 366 to synthesize a 3-D object with such a grid-like or stripe-like pattern as shown in FIG. 3.

The use of the texture mapping technique can greatly reduce the amount of data to be treated. As a result, the image synthesizing system will have its optimum arrangement to treat high-quality images in real time.

As described, the image synthesizing system of the present invention represents a 3-D object 300 as a set of 3-D polygons. In such a case, a problem will be raised in continuation of brightness data at the boundary between adjacent 3-D polygons. If it is wanted to use a plurality of 3-D polygons for forming a sphere and when all the dots in the 3-D polygons are set at the same brightness, the boundary between adjacent 3-D polygons may not be formed with "rounded surface". To avoid such a problem, the image synthesizing system of the present invention utilizes another technique called "Gouraud shading". As shown in FIG. 3, the Gouraud shading technique has given brightness data of vertices I0–I3 to the respective vertices in the 3-D polygons as in the texture mapping technique. When an image is finally displayed in the image display unit 360, brightness data of all the dots in the 3-D polygons are determined from the brightness data of vertices I0–I3 through interpolation. Thus, the problem of "rounded surface" can be overcome while at the same time the amount of data to be processed in the image supply unit 308 to perform rotation, translation, coordinate change and other treatments can be reduced. Therefore, the image synthesizing system of the present invention can have its optimum arrangement to treat high-quality images in real time.

As will be apparent from the foregoing, the image synthesizing system of the present invention can utilize the texture mapping and Gouraud shading techniques to treat high-quality image at high speed.

On the contrary, the image synthesizing system of the present invention requires handling of a polygon having a relatively large area, unlike the image synthesizing system of the prior art which is called "polygonizer". This is for the following reason.

As shown in FIG. 3 and described hereinbefore, the image synthesizing system of the prior art or the polygonizer treats all textures by dividing them into polygons while the image synthesizing system of the present invention independently treats each of the 3-D polygons A, B and C defining the respective surfaces of the 3-D object, with the grid- and/or stripe-like patterns being separately handled as textures. As a result, polygons on which the same texture is applied must be handled as a polygon having a relatively large area. Since the Gouraud shading technique which can be used in the image synthesizing system of the present invention can represent "rounded surface" without division of a polygon into vary small sections, the Gouraud shading technique must also handle a polygon having a relatively large area.

If a pattern on the polygon cannot be represented only by one texture such as grid or stripe, however, a polygon having a relatively small area has to be used. Thus, small-sized polygons will still exist. Therefore, the image synthesizing system of the present invention will be required to treat polygon data including relatively large and small polygons. As will be described, the small polygon will be hidden by the large polygon. This leads to more frequently occurrence of dropout of data. It is therefore a important technical problem how the occurrence of default data can be avoided.

However, the sorting processing system of the present invention can be similarly applied to any image synthesizing system other than the aforementioned image synthesizing system which uses the texture mapping and Gouraud shading techniques. Therefore, the sorting processing system of the present invention can also be naturally applied to the image synthesizing system using the polygonizer and other systems according to the prior art.

(2) Image Supply Unit

The image supply unit 308 comprises an operator's control unit 310, a main CPU 312, a 3-D data memory 314 and a 3-D computing unit 316, as shown in FIG. 2.

Figure 15:
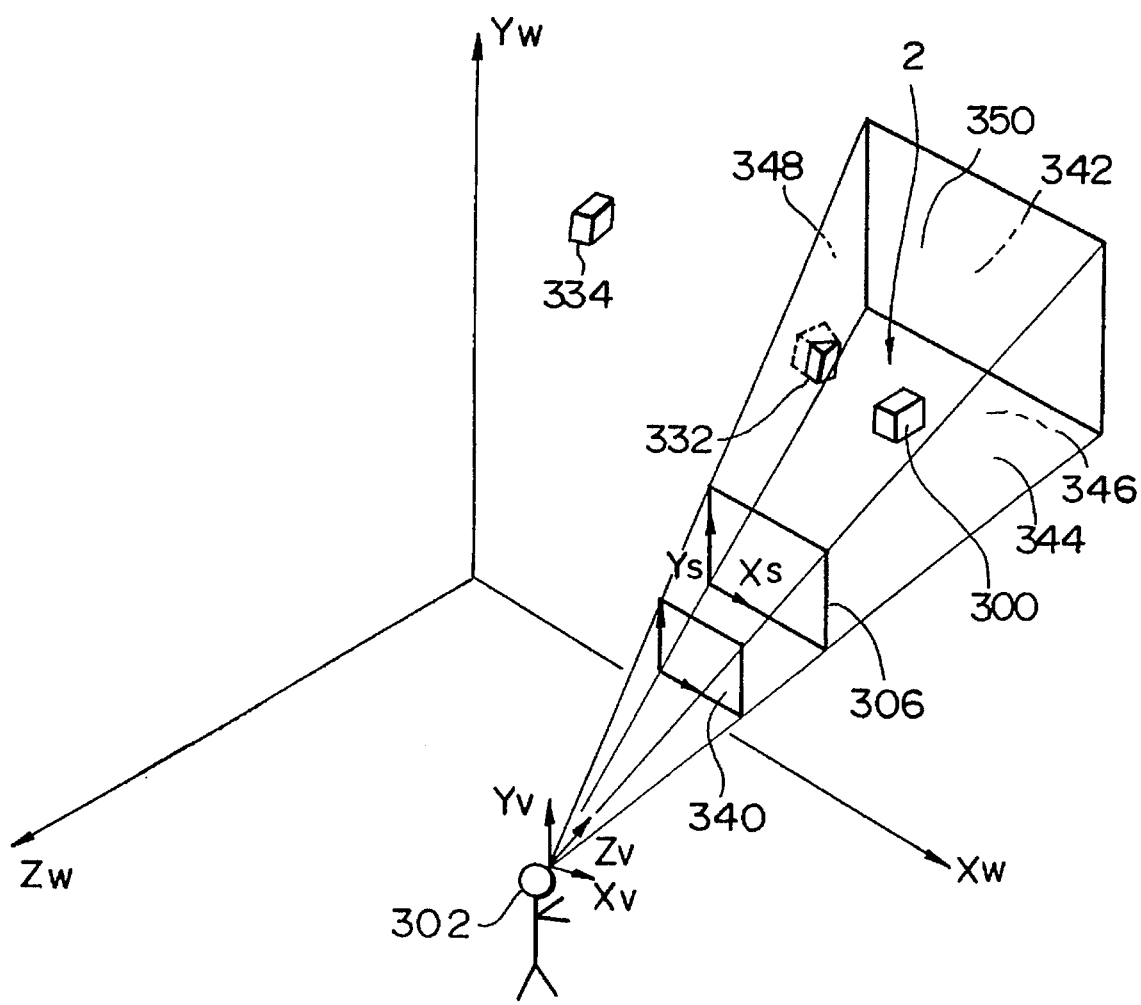
FIG. 15 is a schematic diagram illustrating the summary of computation at a 3-D computing unit.

Referring to FIG. 15, image data relating to the 3-D object 300 is represented as a polyhedron which is divided into 3-D polygons. Coordinates of vertices and associated data have been stored in the 3-D data memory 314.

The 3-D computing unit 316 reads out the coordinates of vertices and responds to control signals from the operator's control unit 310 through the main CPU 312 to perform various computations for the coordinates of vertices. Such computations will be described below.

In a driving game, for example, 3-D objects 300, 332 and 334 which are read out from the 3-D data memory 314 and respectively represent a steering wheel, building and signboard are disposed on a 3-D space which is represented by a world coordinate system (XW, YW, ZW). The image data representing these 3-D objects are then transformed into a view coordinate system (Xv, Yv, Zv) in which the view point of a player 302 is a reference point. The coordinate Zv in the view coordinate system represents a line-of-sight in the player 302 or a depth in a displayed scene. As the value Zv increases, a pseudo 3-D image represented thereby will be positioned more deeply in the scene.

An image treatment called "clipping" is then carried out. The clipping is a process that removes image data out of the visual field of the player 302 (or out of the visual field of a window or windows opened in the 3-D space), that is, out of an area enclosed by forward, rearward, rightward, downward, leftward and upward clipping faces 340, 342, 344, 346, 348 and 350 (which will be referred to "display area 2"). In other words, image data required by the image synthesizing system of the present invention in the subsequent steps are only those within the visual field of the player 302. If the unnecessary image data have been removed by the clipping process, the burden on the subsequent steps can greatly be reduced.

Finally, only the objects within the display area 2 are perspectively transformed into a screen coordinate system (XS, YS), the resulting data being then outputted toward the subsequent sorting processing unit 320.

In the present embodiment, it is to be noted that polygons before being subjected to the perspective transformation are called "3-D polygons" and simply "polygons" after the perspective transformation. Such a distinction is only made for convenience. Actually, the polygons after being subjected to the perspective transformation also have Z-values which are required in the sorting and texture mapping steps.

The sorting processing unit 320 uses input data and sorting data to determine the order of polygon image data to be processed by the subsequent image display unit 360. According to the determined order, the polygon image data will be outputted from the sorting processing unit 320 toward the image display unit 360. More particularly, as shown in FIG. 15, the image data of a polygon having larger coordinate Zv, that is, the image data of a polygon located farthest to the view point is initially outputted. The image display unit 360 will compute the image data sequentially starting from those of the farthest polygon. The structure and operation of the sorting processing unit 320 will further be described later.

(3) Image Display Unit

The image display unit 360 has a function of computing image data of all the dots in each 3-D polygon from image data which are inputted into the image display unit 360 from the sorting processing unit 320 according to the predetermined order and given to the polygon at the respective vertices. The operation of the image display unit 360 will be described briefly.

A processor unit 362 first receives polygon image data such as coordinates of vertices, texture coordinates of vertices, brightness data of vertices and other data all of which correspond to the respective vertices of each polygon sequentially from the sorting processing unit 320. Common data shared by all of the dots in a polygon are inputted into an attribute RAM unit 368 as attribute data.

The processor unit 362 determines representing coordinates, texture coordinates (TX, TY) and brightness data BRI for all the dots in each polygon from the coordinates of vertices, texture coordinates of vertices, brightness data of vertices and other data. The determined texture coordinates (TX, TY) and brightness data BRI are written into a field buffer unit 364 using the representing coordinates as addresses.

When an image is to be displayed, the texture coordinates (TX, TY) are read out from the field buffer unit 364 and used as addresses to read out texture data from a texture data storage unit 366. These data and the attribute data from the attribute RAM unit 368 are used by a palette/mixer circuit 370 to form RGB data which are in turn outputted through the CRT 330 for forming the image.

2. Explanation of Sort Processing Unit (1) Outline

As described, the hidden surface removal technique of the prior art, which is called "Z-buffer technique", refers to a Z-buffer 324 when the interior of a polygon is to be painted with color. The Z-value of a polygon for every dot is compared with Z-value stored in the Z-buffer 324. The comparison result must be written in the Z-buffer before the color painting step is carried out. For example, the color painting step should be completed for all the dots of 640× 400=256,000 within a time period of 1/60 seconds. Therefore, the Z-buffer technique is not suitable for use in the image synthesizing system which must treat high-quality images in real time. Particularly, the image synthesizing system of the present invention requires such an excess computation as little as possible since it is adapted to perform the computation of dot brightness through the Gouraud shading technique, in addition to the color painting process.

For such a purpose, the image synthesizing system of the present invention determines Z-representative values for all the dots in each polygon and uses these Z-representative values to set sorting Z-values at every polygon. All the subsequent steps will be carried out for every polygon according to the priority which is determined by the sorting Z-values. More particularly, an average value between the maximum and minimum Z-values in a polygon at each vertex may be computed as a Z-representative value which is set at each polygon as a sorting Z-value. The subsequent or polygon drawing step will be carried out sequentially starting from a polygon having the maximum sorting Z-value, that is, a polygon farthest from the displayed scene. Such a technique does not require any reference to the Z-buffer and others when the dots in each polygon are treated. This can provide a sorting processing system which is most suitable for use in the image synthesizing system processing high-quality images in real time.

However, it has been found that such a technique raises the following problem when the image computing and processing are performed.

Figure 4:
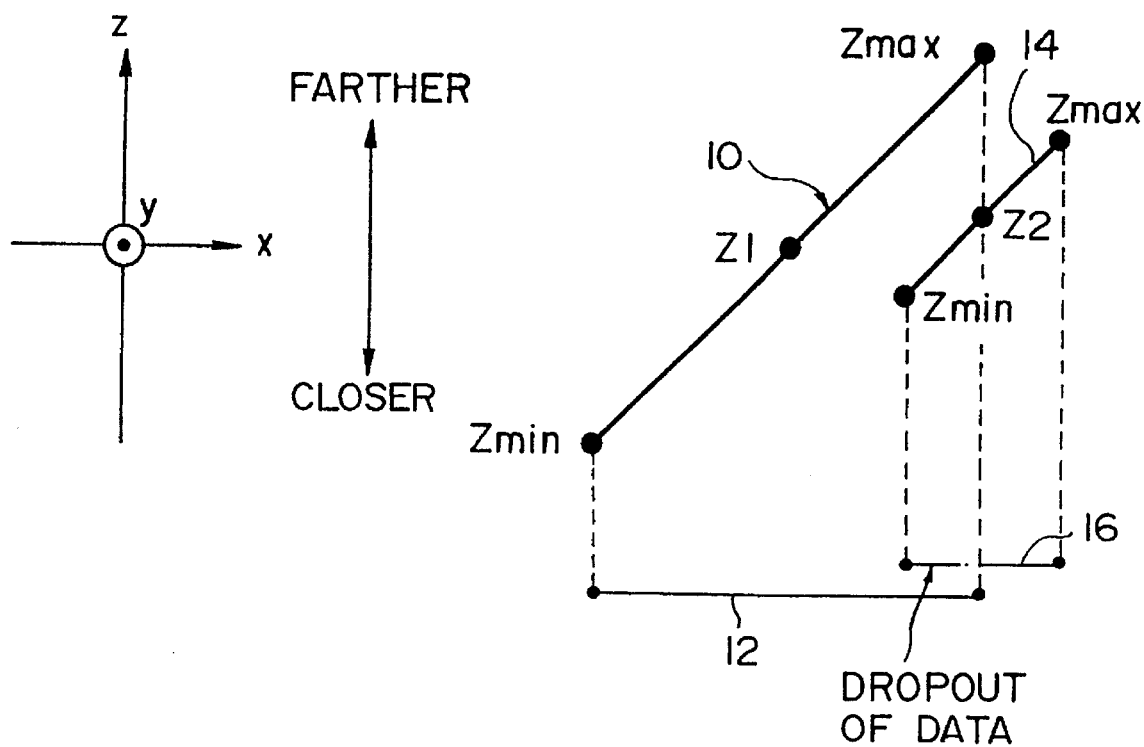
FIG. 4 is a schematic diagram illustrating a problem of dropout data when the Z-representative value is used.

FIG. 4 shows a case when a 3-D polygon 10 having a relatively large area is disposed relatively close to another 3-D polygon 14 having a relatively small area. In such a case, according to a formula, Z-representative value=$(Z_{min}+Z_{max})/2$, the Z-representative value of a polygon 12 corresponding to the 3-D polygon 10 is computed as Z1 and the Z-representative value of a polygon 16 corresponding to the 3-D polygon 14 is computed as Z2. In the subsequent steps, these values Z1 and Z2 are set at each polygon as sorting Z-values. The steps will be carried out according to the priority determined by the sorting Z-values. In other words, since Z1<Z2, the polygon 16 having its larger Z-representative value is initially drawn, followed by the drawing of the polygon 12. As a result, there will be produced dropout parts of the data of the polygon 16. This disables the correct image display.

Such a disturbed priority tends to be produced when two polygons having very different magnitudes are located close to each other. Since the areas of the polygons are relatively increased by the use of the texture mapping and Gouraud shading techniques as described, such a situation particularly tends to be produced. It is therefore an important technical problem how such a situation can be avoided.

For such a purpose, the present embodiment uses four techniques which will be described below.

(2) First Technique and Arrangement

Figure 5A:
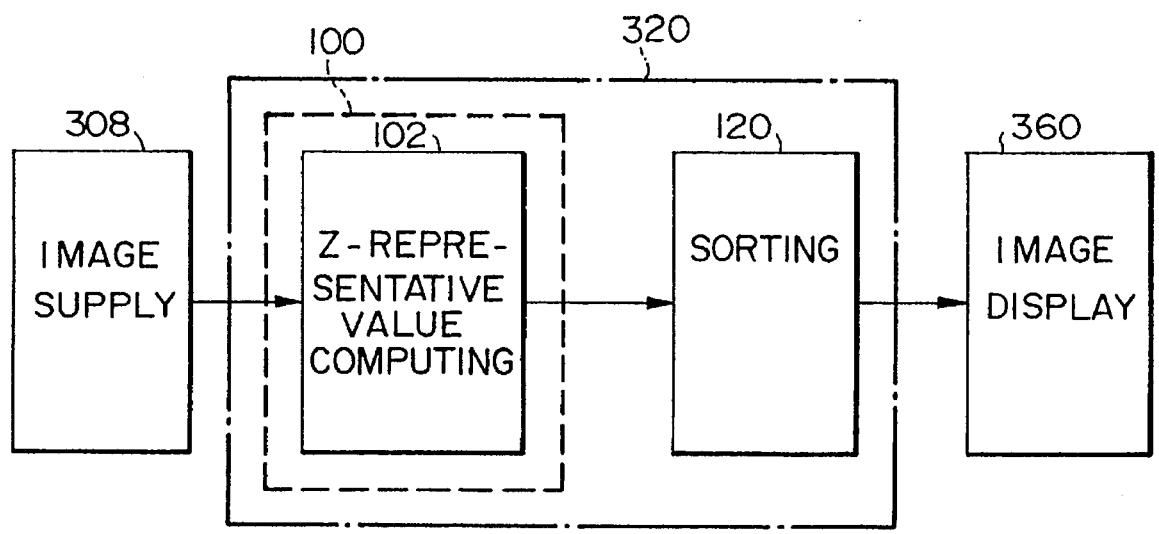

The first technique used in the present embodiment is that the Z-representative value computing process is changed for from one polygon to another. According to the first technique, the sorting processing unit 320 comprises a sorting Z-value setting unit 100 and a sorting unit 120, as shown in FIG. 5A.

The sorting Z-value setting unit 100 includes a Z-representative value computing unit 102 which computes a Z-representative value using a representative value setting pattern previously specified for the characteristics of each polygon. In other words, the present embodiment can compute a Z-representative value by selecting and using one of the following Z-representative value setting patterns which has been previously specified for each polygon:

Z-representative value=$Z_{min}$ (which is the minimum value of the Z-coordinates of the vertices in a polygon and will be referred to "minimum value" hereinafter);

Z-representative value=$Z_{max}$ (which is the maximum value of the Z-coordinates of the vertices in the polygon and will be referred to "maximum value"); and Z-representative value=$(Z_{min}+Z_{max})/2$ (which is an average value between said minimum and maximum values and will be referred to "average value").

Which Z-representative value setting pattern should be specified from the above Z-representative value setting patterns depends on a program forming a game space or other form and the characteristics of a polygon in question including the location, size and other factors. More particularly, a specification data used to perform such a specification is contained in the polygon image data, as shown in FIG. 9B. The polygon image data has been stored in the 3-D data memory 314 of FIG. 2. Depending on the game space forming program and the characteristics of the polygon in question, the specification data stored in the 3-D data memory can be rewritten to determine which Z-representative value setting pattern should be specified for every polygon.

In a normal polygon, the "average value" of the Z-representative value setting patterns is specified to compute the "average value" as a Z-representative value. This is because the setting of this value at the normal polygon provides the least probability of dropout of data. In such a polygon that produces error such as dropout of data even by this setting, the Z-representative value will be set at $Z_{max}$ or $Z_{min}$ to avoid the error such as dropout of data or other.

This technique is effective for case when a scene including a sign-board 20 to which letters 22, 24 and 26 are applied is to be synthesized. When 3-D polygons are to be synthesized into a scene in such a positional relationship and if the "average value" is set to be a Z-representative value for all of the signboard 20 and letters 22, 24 and 26, the letter 22 does not have any dropout of data, but the other letters 24 and 26 have dropout of data. In such a case, therefore, the "maximum value" is set to be a Z-representative value for all of the sign-board 20 and letters 22, 24 and 26. Since the Z-representative value of the sign-board 20 is maximum among them, the letters 22, 24 and 26 will be drawn after the sign-board 20 has been drawn. This prevents the occurrence of dropout of data.

Although the present embodiment has been described as to the selection among three Z-representative value setting patterns, that is, "minimum value", "maximum value" and "average value", the present invention is not limited to such a case, but may be applied to select either of the "maximum value" or "average value" or either of the "minimum value" or "average value" or either of the "maximum value" or "minimum value"

The Z-representative value setting patterns may include one that uses an average value between the Z-coordinates in all the vertices as a Z-representative value. However, the use of such an average value is disadvantageous in that it increases the computing cost.

After the Z-representative value for each polygon has been computed by the Z-representative value computing unit 102, it is set to be a sorting Z-value at that polygon. The data of a polygon at which the sorting Z-value has been set is then inputted into the sorting unit 120. The sorting unit 120 uses the sorting Z-value to determine the priority of the polygon data. More particularly, the image data of a polygon having the maximum sorting Z-value will have the highest priority. According to the priority or in the order starting from the maximum sorting Z-value, the polygon image data are sequentially outputted from the sorting unit 120. Thus, the subsequent image display unit 360 will process the polygon image data in the order of output. As a result, polygons can be drawn sequentially starting from the polygon having the maximum sorting Z-value. This enables the hidden surface removal simply with less error.

(3) Second Technique and Arrangement

The second technique is one that a shift value is added to a Z-representative value computed by the first technique to compute a more appropriate priority. If three or more 3-D polygons and three or more 3-D objects are arranged in a complicated manner, for example, the second technique can provide a more appropriate priority for the 3-D polygons and 3-D objects.

Figure 6A:
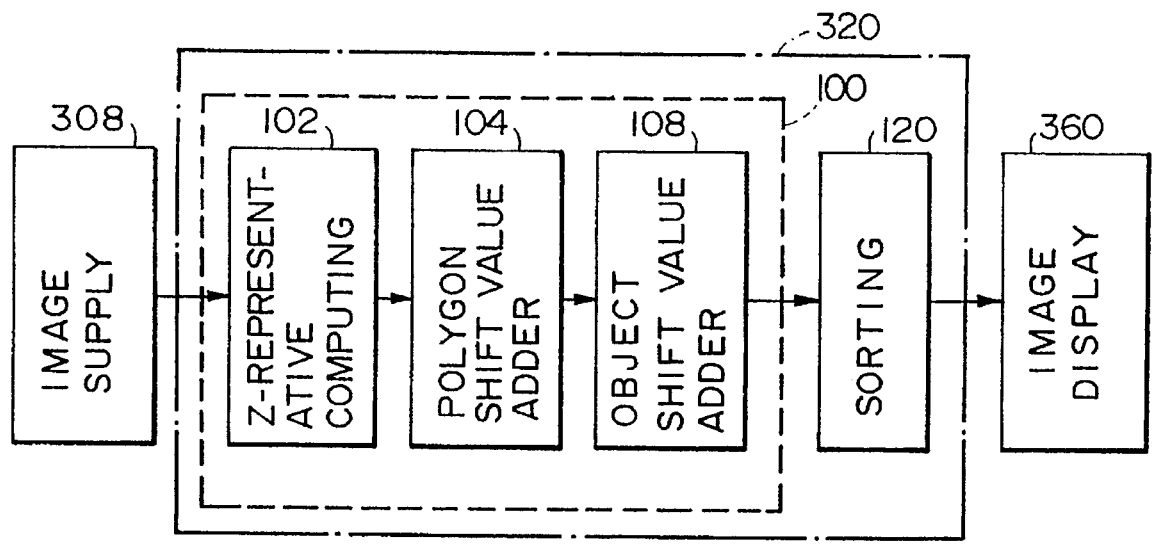

According to the second technique, the sorting Z-value setting unit 100 of the sorting processing unit 320 comprises a polygon shift value adder unit 104 and an object shift value adder unit 108 in addition to the Z-representative value computing unit 102, as shown in FIG. 6A. This enables the addition of shift value to the Z-representative value computed by the Z-representative value computing unit 102. In such a case, the addition of shift value to each of the polygons is carried out at the polygon shift value adder unit 104. The object shift value adder unit 108 can add a shift value to each of the 3-D objects. By adding the shift value to each of the 3-D objects, the simultaneous addition of shift values to all the polygons defining the 3-D objects can be made to control and set a priority more efficiently.

The added shift values have been set in sorting control data contained in the polygon and object data as Z-shift values, as shown in FIGS. 9A, 9B and 10A–10C. The sorting control data have been stored within the 3-D data memory with the other image data of 3-D objects. By rewriting these stored data, therefore, the Z-shift value can be changed for every polygon and for every 3-D object.

Figure 6B:
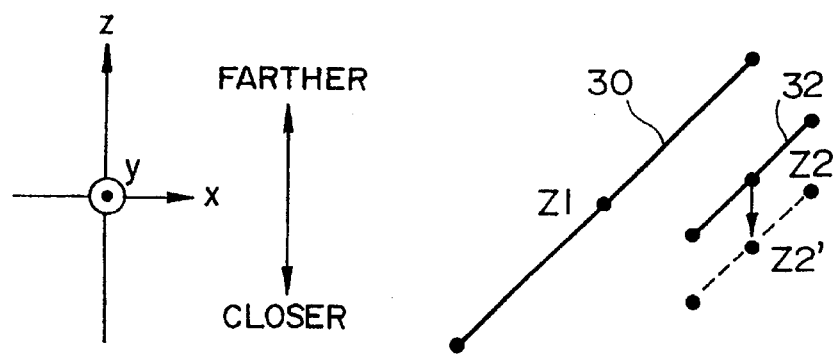
FIGS. 6B and 6C are schematic diagrams illustrating the second technique.

The second technique is effective for 3-D objects 30 and 32 in which their Z-representative values can only be set to "average values" and yet which are disposed in such a positional relationship as shown in FIG. 6B. In such a case, the Z-representative value Z2 of a polygon corresponding to the 3-D polygon 32 becomes larger than the Z-representative value Z1 of a polygon corresponding to the 3-D polygon 30. As a result, the polygon corresponding to the 3-D polygon 32 will have dropout of data. To avoid this problem, an appropriate negative shift value is added to the Z-representative value of such a polygon to form a sorting Z-value. By setting Z2'<Z1, a correct priority can be set to prevent dropout of data in a polygon corresponding to the 3-D polygon 32 in an effective manner. On the contrary, a positive shift value may be added to the value Z1 to provide the same advantage.

For simplicity, a polygon corresponding to a 3-D polygon, that is, a polygon after having been perspectively transformed from a 3-D polygon will be referred to by the same reference numeral as that of the 3-D polygon. For example, the 3-D polygon 32 and the corresponding polygon will collectively be called simply "polygon 32".

It is to be noted that the Z-representative value used herein is completely different from the Z-coordinate value in a 3-D coordinate system of an actual polygon and independently used only for sorting. Even if a very large positive shift value is added to the Z-representative value Z1, for example, this will not fully influence the Z-coordinate value in the actual polygon 30. In such a case as the polygon 30 is always located behind the polygon 32, a very large positive shift value may be added to the Z-representative value of the polygon 30 without any obstruction. By adding such large shift values, the polygons can be arranged with a correct priority even if the polygons are viewed from various different directions. In a driving game, for example, houses, trees and other background matters viewed opposite to a guard road rail can be drawn with the correct order or priority by adding larger shift values to the Z-representative values.

Figure 6C:
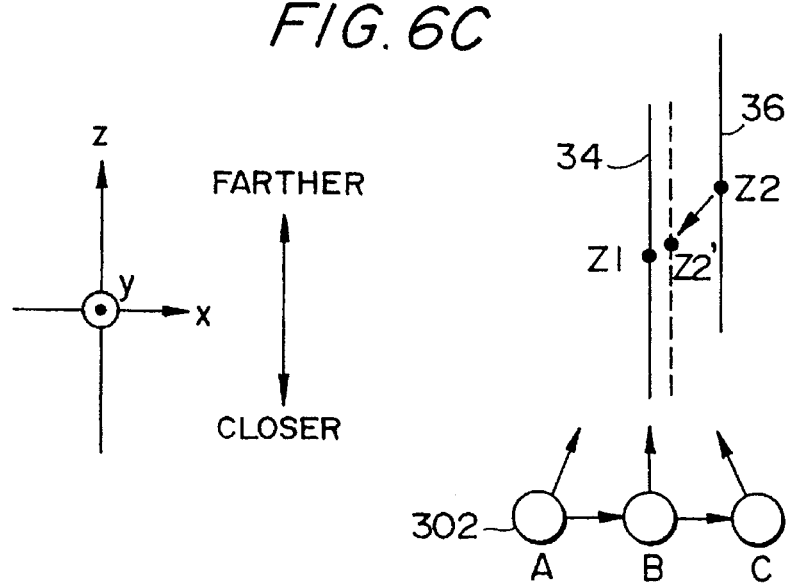

Although there has been described an effective case when the Z-representative values of the polygons are remote from one another, FIG. 6C shows another effective case when the Z-representative values of the polygons are close to one another.

When 3-D polygons 34 and 36 are located in such a positional relationship as shown in FIG. 6C and the view point of the player 302 changes from A through B to C, the polygons 34 and 36 should be viewed by the player 302 while being changed as follows:

If the view point of the player 302 is in the position A, the polygon 34 should be viewed above the polygon 36. If the view point is in the position B, the polygons 34 and 36 should be viewed parallel to each other. If the view point is in the position C, the polygon 36 should be viewed above the polygon 34. As shown in FIG. 6C, however, the positional relationship between the polygons 34 and 36 may not faithfully be reproduced if the polygon 36 is in a position relatively remote from the polygon 34. In other words, it will be judged that the polygon 34 is located above the polygon 36 since Z1<Z2 even if the view point is changed from the position B to the position C. This means that the actual positional relationship will not faithfully be reproduced.

The present embodiment overcomes such a problem by adding a negative shift value to the Z-representative value Z2 of the polygon 36. More particularly, the problem can be solved by adding any suitable shift value to the Z-representative value such that Z1>Z2' when the view point is in the position C. Even if such a procedure is actually taken, some disturbance of priority cannot be avoided, but the degree of priority disturbance can be greatly reduced. For example, when two plate-like matters are rotated, such a rotation can be effectively reproduced without much disturbance of priority.

(4) Third Technique and Arrangement

Figure 7A:
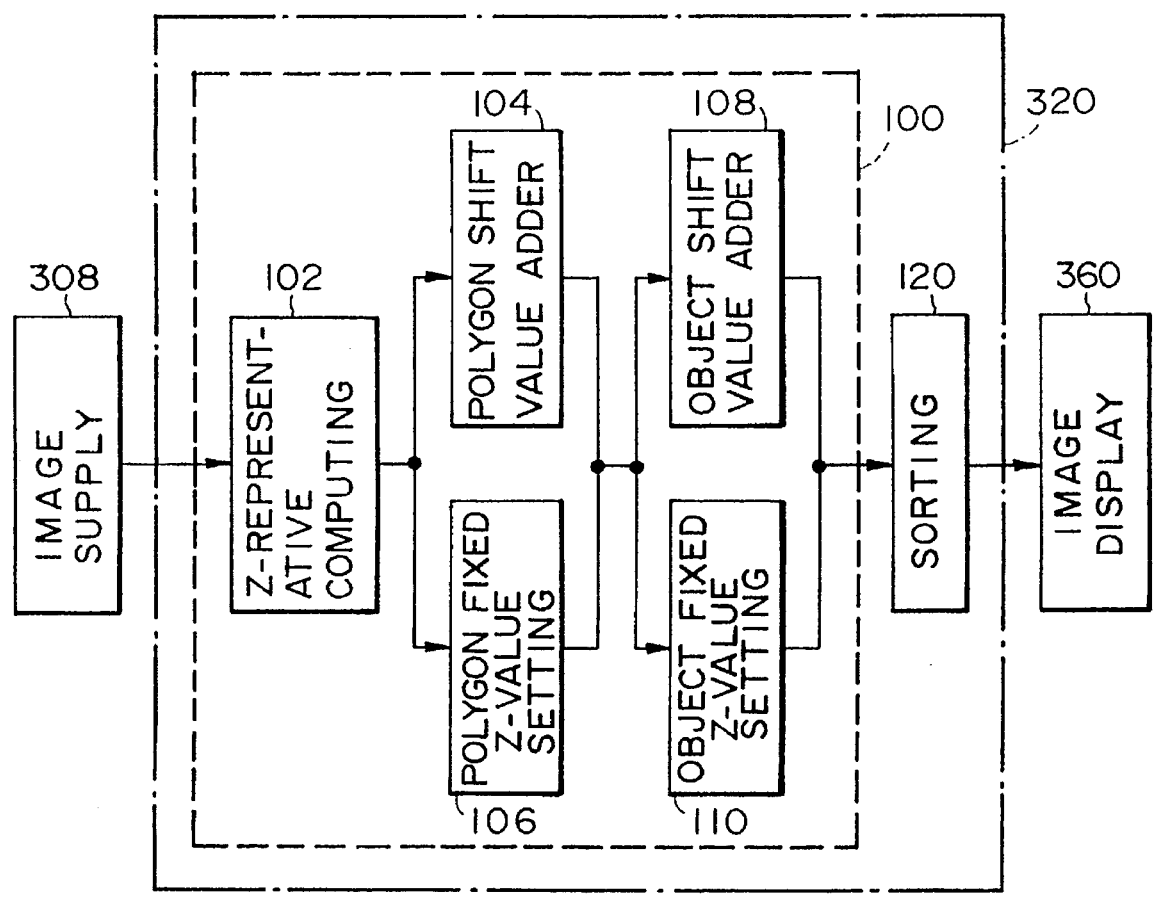

The third technique is to set the computed Z-representative value into a fixed value by force to provide a sorting Z-value. According to the third technique, the sorting Z-value setting unit 100 of the sorting processing unit 320 comprises a polygon fixed Z-value setting unit 106 and an object fixed Z-value setting unit 110 in addition to the Z-representative value computing unit 102, polygon shift value adder unit 104, and object shift value adder unit 108, as shown in FIG. 7A. The polygon and object fixed Z-value setting units 106 and 110 enable the setting of a Z-representative value into a fixed value for every polygon and object. The third technique is effective in determining the priority of polygon and 3-D object which are always located farther from the other polygons and objects and have the predetermined priority relationship therebetween, as in the background scene.

Figure 7B:
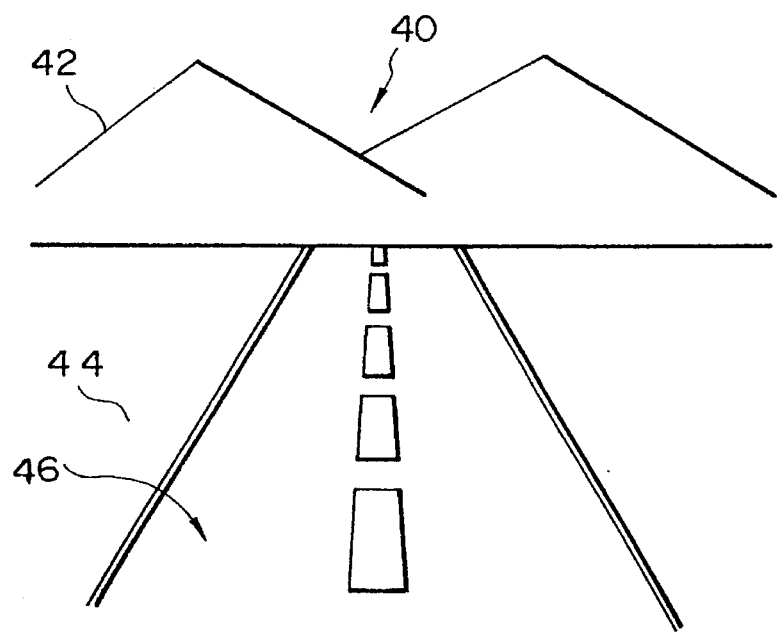
FIG. 7B is a schematic diagram illustrating the third technique.

FIG. 7B shows a displayed scene in a driving game to which the present embodiment is applied. As shown, the driving game has a fixed positional relationship between 3-D objects such as the sky 40, mountains 42, the ground 44 and road 46. The sky object 40 must always be located deepest in the scene under any situation. The Z-representative values of the 3-D objects or polygons corresponding to the 3-D objects are set into fixed values by the polygon and object fixed Z-value setting units 106 and 110 to form sorting Z-values. In other words, the case of FIG. 7B is set such that the Z-representative values of the sky 40, mountains 42, the ground 44 and road 46 respectively become fixed values Z1, Z2, Z3 and Z4 in such a relationship as Z1>Z2>Z3>Z4. Therefore, images can be synthesized according to the correct priority shown in FIG. 7B. It is desirable in such a case that the fixed values Z1, Z2, Z3 and Z4 are as Large as possible, that is, always larger than the Z-representative values of the other polygons and objects.

As shown in FIGS. 9A, 9B and 10A–10C, the fixed values set at the Z-representative values have been previously set in sorting control data within the polygon and object data as fixed Z-values. Therefore, the fixed Z-values can be rewritten to make the setting of fixed Z-value for every polygon and object.

(5) Fourth Technique and Arrangement

Figure 1:
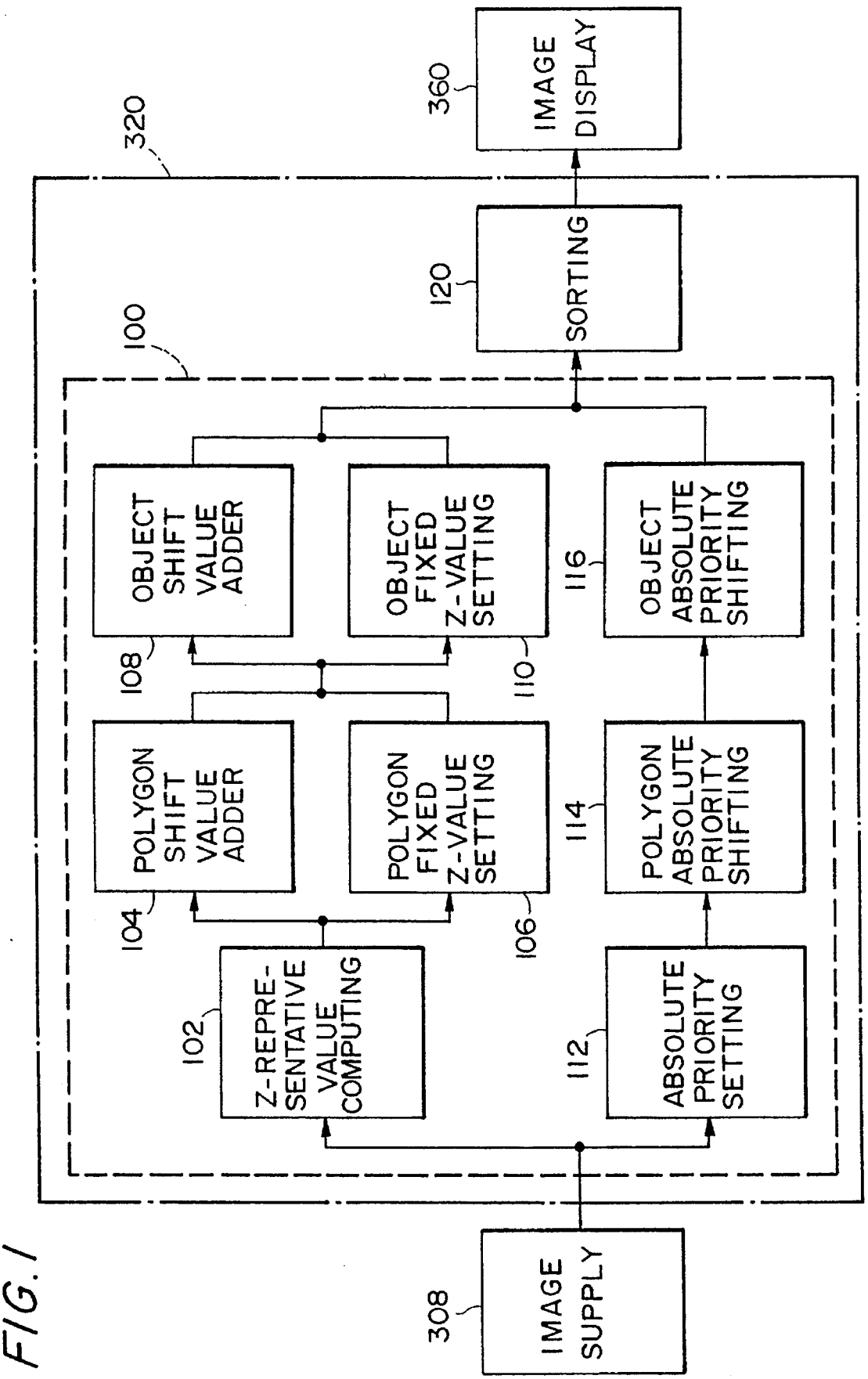
FIG. 1 is a block diagram of one preferred embodiment of a sorting processing system constructed in accordance with the present invention.

The fourth technique is to provide an absolute priority bit at the high-order bit of a computed Z-representative value and to perform an absolute control of the priority by the use of the absolute priority bit independently of the low-order bit. According to the fourth technique, the sorting processing unit 320 comprises an absolute priority setting unit 112, a polygon absolute priority shifting unit 114 and an object absolute priority shifting unit 116 in addition to the Z-representative value computing unit 102, polygon and object shift value adder units 104, 108 and polygon and object fixed Z-value setting units 106 and 110, as shown in FIG. 1. The absolute priority setting unit 112 can set the absolute priority bit at the high-order bit of the computed Z-representative value. The polygon and object absolute priority shifting units 114 and 116 can add a shift value to the set absolute priority bit for every polygon or 3-D object.

Figure 8:
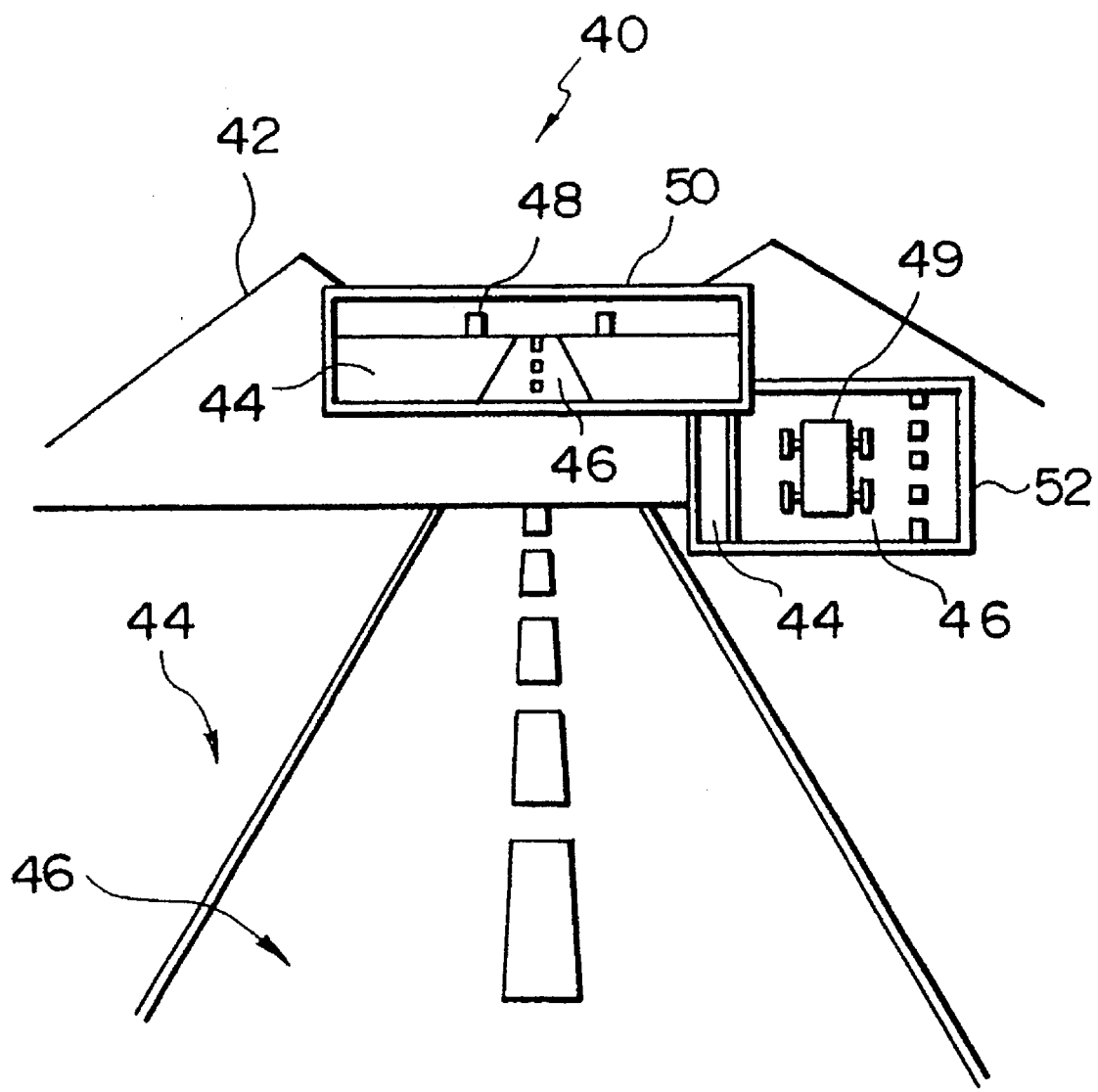
FIG. 8 is a schematic diagram illustrating the fourth technique used in the present embodiment.

As shown in FIG. 8, the fourth technique can form windows 50 and 52 in a displayed scene, in a driving game, for example, the formation of windows enables the display of images such as views in a rear-view mirror and side mirror and another racing car 49 which are viewed in the directions of various visual fields. In FIG. 8, the window 50 represents a view in the rear-view mirror while the window 52 represents the racing car 49 as viewed from the upward position. These windows will be formed as follows:

The polygon absolute priority bit of polygons which construct buildings 48, ground 44, road 46 and others viewed in the window 50 is set at (000). The absolute priority bit of polygons which construct ground 44, road 46 and the racing car 49 and others viewed in the window 52 is set at (001). The absolute priority bit of all the polygons and 3-D objects located out of the windows 50 and 52 is set at (010). The sorting Z-values of all the polygons within the window 50 are thus always smaller than those of the polygons within the window 52. Further, the sorting Z-values of all the polygons within the window 52 are always smaller than those of the polygons out of the windows 50 and 52. In such a manner, a scene in which images representing a view in the rear-view mirror and racing car as viewed from the upward position can be synthesized and displayed while being superimposed one above another.

The addition of shift value to the absolute priority bit provides the following effects:

Shift values added to the absolute priority bits can be set in the sorting control data as absolute priority shift values for every polygon and 3-D object, as shown in FIGS. 10A–10C. By setting the absolute priority shift values, therefore, the set polygons and 3-D objects can be displayed absolutely forward and/or rearward, irrespectively of the priority of the other polygons and 3-D objects. This can produce an image effect which would not be provided by the prior art.

(6) Operation of Sorting Z-Value Setting Unit

The image supply unit 308 performs the process to data in such formats as shown in FIGS. 9A and 9B.

FIG. 9A shows the entire form of a format of data to be processed in the image supply unit 308. As shown, the data to be processed includes a continuous train of object data for all the objects displayed in a frame, the forwardmost data being a frame data. Subsequent to each of the object data train, there is another continuous train of polygon data for polygons defining the objects.

The frame data are formed depending on a variable parameter for every frame and include common data to all the 3-D objects in one frame such as data of the view point, view angle and visual field angle of the player, monitor angle, monitor size, light source and other factors. These data are set for every frame. If windows are formed in the displayed scene as described, different frame data may be set for windows. In the window 50 (rear-view mirror) shown in FIG. 8, the frame data parts of view angle are set as viewed in the rearward direction relative to the view angle of the player. In the window 52, the data of view angle are set as viewed in the upward direction relative to the racing car. Data of the absolute priority bit used in the fourth technique are also included in the frame data.

The object data are formed depending on a parameter for every 3-D object and include data of position, rotation and other factors for every 3-D object.

The polygon data are formed depending on polygon image data and other data and include header, representative value setting data, sorting control data, brightness data of vertices I0–I3, texture coordinates of vertices TX0, TY0–TXS, TYS, coordinates of vertices X0, Y0, Z0–X3, Y3, Z3 and other data. The present invention can handle not only square polygons, but also any other form of polygon. If a polygon has the number of vertices equal to n, the brightness data of vertices become I0–In; texture coordinates of vertices TX0, TY0–TXn, TYn; and coordinates of vertices X0, Y0, Z0–Xn, Yn, Zn.

The brightness data of vertices and texture coordinates of vertices are only required when the Gouraud shading and texture mapping techniques are used as described.

The representative value setting data are used to specify which setting pattern should be selected from the representative value setting patterns used to set the sorting Z-representative values.

The sorting control data are used to control the sorting process and to represent formats shown in FIGS. 10A and 10B. The sorting control data are comprised of 22 bits and classified into sorting control data used for shift value addition (FIG. 10A) and another sorting control data used for fixed Z-value setting (FIG. 10B).

The data for shift value adding have the most significant bit set at zero and consist of an absolute priority shift value of three bits and a Z shift value of 18 bits, which are used to add shift values to the absolute priority bit and Z-representative value, respectively.

The data for fixed Z-value setting with the most significant bit set at one consist of a fixed Z-value of 21 bits and is used to set the fixed Z-value.

Although not shown in FIG. 9A, the object data also include sorting control data for the formats shown in FIGS. 10A and 10B, which can be used to perform the addition of shift value and also to set fixed Z-values for every 3-D object.

The sorting processing unit 320 receives these data to sort the polygon data which will be described with reference to FIG. 1.

First of all, polygon data are inputted into the Z-representative value computing unit 102 which in turn uses the coordinates of vertices included in the polygon data to compute the Z-representative values according to the aforementioned techniques. In such a case, a representative value setting pattern is specified by the representative value setting data described above.

The most significant bit of the sorting control data included in the polygon data is then referred to. If the most significant bit is "0", the polygon shift adder unit 104 adds a shift value to the Z-representative value for every polygon. If the most significant bit is "1", the polygon fixed Z-value setting unit 106 sets a fixed Z-value at each polygon. In this case, the added shift value and set fixed Z-value are as shown in FIGS. 10A and 10B.

The object shift value adder unit 108 and object fixed Z-value setting unit 110 set the addition of shift value and the setting of fixed Z-value for every 3-D object, respectively. More particularly, the most significant bit of the sorting control data included in the object data is referred to select whether the shift value should be added or the fixed Z-value should be set. If the addition of shift value is selected, shift values are added respectively to the Z-representative values of all the polygons included in each 3-D object. More particularly, shift values may be added to the Z-representative value of all the polygons included in an object 1 as shown in FIG. 9A. If the setting of fixed Z-value is selected, fixed Z-values are similarly set to the Z-representative values of all the polygons included in each 3-D object.

The absolute priority setting unit 112 uses the inputted frame data to set absolute priority data of three bits. For example, the absolute priority bits (000) are set at the polygons belonging to the window 50; the absolute priority bits (001) are set at the polygons belonging to the windows 52; and the absolute priority bits (010) are set at the polygons out of the windows 50 and 52. These data can be updated for each frame. For example, if the player uses an control signal to display windows on a scene, the frame data is rewritten to change the absolute priority so that the windows will properly be displayed on the displayed scene.

The polygon absolute priority shifting unit 114 then performs the addition of absolute priority shift value for each polygon. The shift value used herein is the absolute priority shift value of three bits shown in FIG. 10A. The object absolute priority shifting unit 116 further performs the addition of shift value for each 3-D object. Thus, the addition of shift value will be carried out to the absolute priority bits of all the polygons included in the 3-D object.

The data thus computed are combined to form a sorting Z-value of 24 bits for the format shown in FIG. 10C. In other words, a low-order sorting Z-value part of 21 bits is formed from the output of the object shift value adder unit 108 or object fixed Z-value setting unit 110 while an absolute priority part of three bits is formed from the output of the object absolute priority shifting unit 116.

(7) Operation of Sorting Unit

Figure 11A:
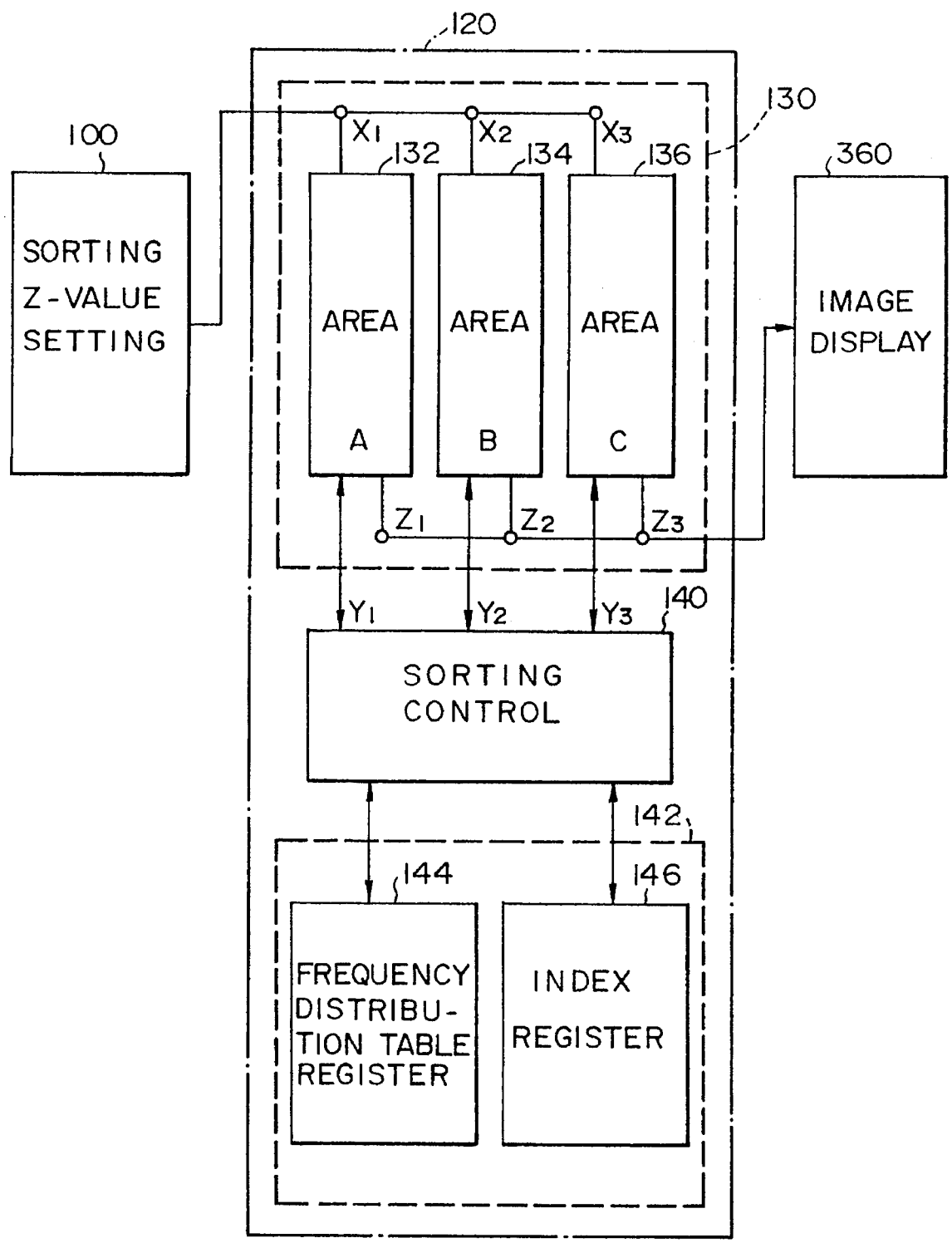

The sorting unit 120 uses a sorting Z-value set to each polygon in the above manner to permutate the polygon data. As shown in FIG. 11A, the sorting unit 120 comprises a data RAM 130, a sorting control unit 140 and a sorting RAM 142.

Polygon data inputted from the sorting Z-value setting unit 100 are first received and stored by the data RAM 130. When all the polygon data in one field have been stored, the sorting Z-values in the stored polygon data are read by the sorting control unit 140 which in turn uses the sorting control Z-values to sort the polygon data. The sorting of data is carried out by the frequency sorting technique. More particularly, a frequency distribution table is prepared by the sorting control unit 140 on the sorting Z-values and then written into a frequency distribution table register 144 in the sorting RAM 142. Thereafter, the frequency distribution table is used to prepare a priority table which is in turn used to rewrite the contents of the frequency distribution table register 144.

Next, the sorting control unit 140 again reads out all the sorting Z-values from the data RAM 130 and uses the priority table written in the frequency distribution table register 144 to determine the priority of the polygon data. According to the priority, the sorting control unit 140 writes addresses of the corresponding polygon data or addresses in the data RAM 130 in an index register 146 at its register sections, respectively.

The addresses are sequentially read out from the index register 146. A polygon data corresponding to each of the addresses is read out from the data RAM 130 and outputted toward the image display unit 360. Thus, the polygon data sorting process using the sorting Z-values computed at the sorting Z-value setting unit 100 is completed.

The details of the respective components will be described below.

Figure 11B:
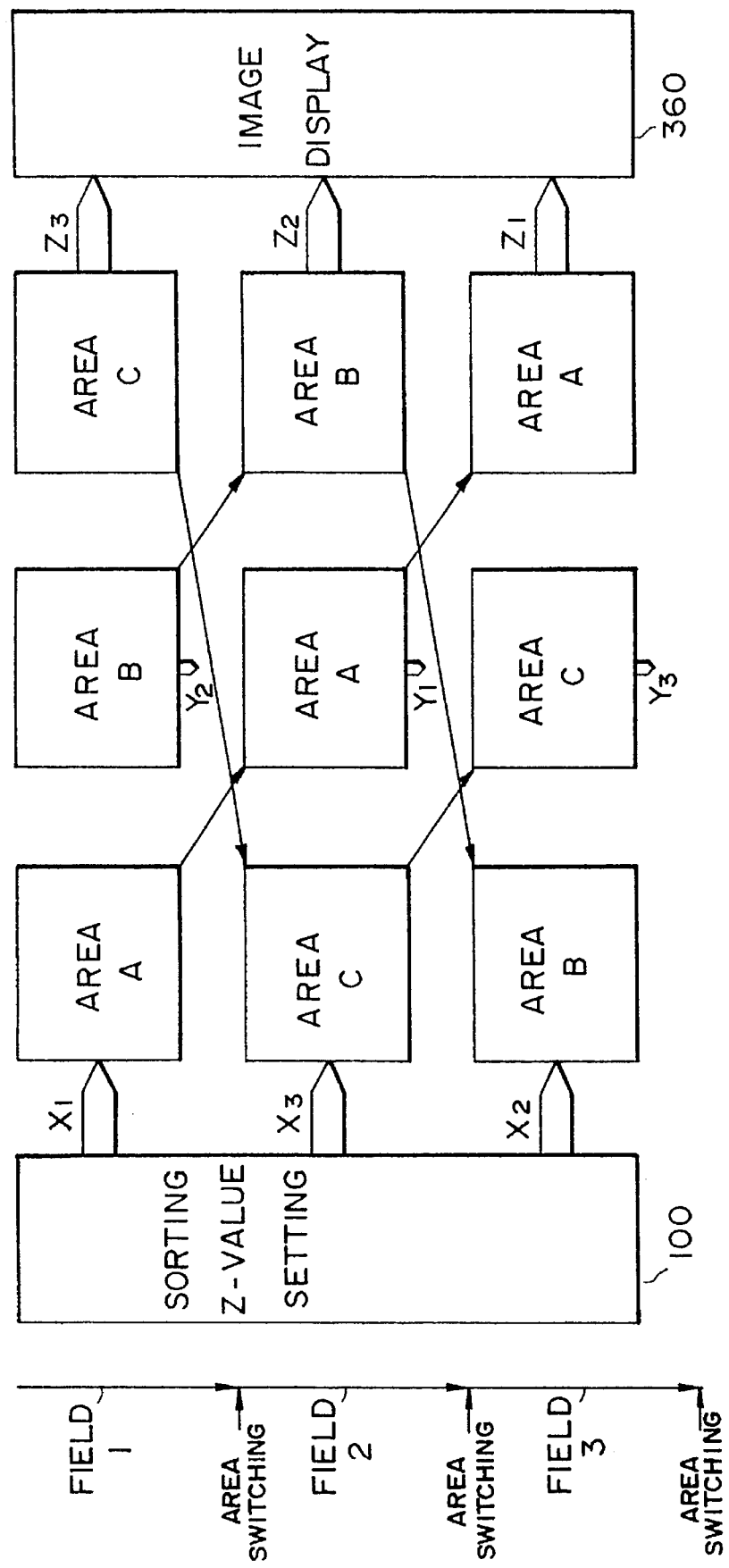
FIG. 11B is a schematic diagram illustrating the operation of the sorting unit.

The data RAM 130 functions as a kind of data buffer and performs three treatments, that is, a first treatment of receiving polygon data from the sorting Z-value setting unit 100, a second treatment of outputting sorting Z-values to the sorting control unit 140 and a third treatment of outputting the sorted polygon data toward the image display unit 360. In the present embodiment, these treatments are carried out in pipe-line system. Thus, the data RAM 130 is divided into three areas, that is, area A 132, area B 134 and area C 136. These areas can be switched from one to another by switching ports X1–X3, Y1–Y3 and Z1–Z3. This is shown in FIG. 11B. Each of the areas A, B and C has a capacity that can store all the polygon data in one field.

As shown in FIG. 11B, each of the areas will operate in the field 1 in the following manner. More particularly, the area A 132 is connected to the sorting Z-value setting unit 100 through the port X1 to receive and store the polygon data from the sorting Z-value setting unit 100. The area B 134 is connected to the sorting control unit 140 through the port Y2 to output the sorting Z-values toward the sorting control unit 140. Further, the area C 136 is connected to the image display unit 360 to output the sorted polygon data toward the image display unit 360.

In the next field 2, the switching of ports will be made as follows. The port Y2 is switched to the port Y1. The sorting Z-values are outputted from the area A 132 to the sorting control unit 140. In this case, the outputted sorting Z-values are extracted from the polygon data stored in the field 1. The port Z3 is switched to the port Z2. The sorted data are outputted from the area B 134 toward the image display unit 360. The output of the sorted polygon data is carried out using the addresses written in the index register 146. Furthermore, the port X1 is switched to the port X3. Polygon data to be newly processed are written from the sorting Z-value setting unit 100 into the area C 136.

In the field 3, the switching of parts is further carried out. For example, the sorted polygon data are outputted from the area A 132.

Thus, the data RAM 120 has three switchable areas by which three treatments of polygon data input, sorting and sorted data output can be carried out in pipe-line system. By switching the ports from one to another, thus, one area performs one separate role for each field. As a result, the transfer of data between the areas will not be required. This enables a high-speed sorting operation. For example, the data themselves written in the area A 132 will not be rewritten in any way even when a mode of receiving the polygon data from the sorting Z-value setting unit 100 is switched to another mode of outputting the sorting Z-value toward the sorting control unit 140. Even when the mode is switched to a mode of outputting the sorted data toward the image display unit 360, the data themselves written in the area A 132 will not be rewritten except the change of address used to perform the readout operation.

The data sorting is carried out by the sorting control unit 140 and sorting RAM 142. In this case, the contents written in the sorting RAM 142 are actually sorted. The polygon data themselves written in the data RAM 130 will not be sorted. Thus, the present invention can provide a high-speed sorting process since it is not required to sort the data written in the data RAM 130 itself.

The layout and operation of the sorting control unit 140 and sorting RAM 142 will be described in details.

First of all, a sorting Z-value is inputted from the data RAM 130 into the sorting control unit 140.

The sorting control unit 140 uses this sorting Z-value to prepare a frequency distribution table on which a priority is determined. This is shown in FIGS. 16A, 16B and 16C.

FIG. 16A shows the correspondence between the polygon data and the sorting Z-value in which X(1)–X(20) represent the respective polygon data, the lower row describing the sorting Z-values corresponding to the polygon data. It is to be noted herein that such a table is simplified for convenience and can actually handle the number of polygon data equal to 8192. Each of the sorting Z-values is represented by a binary number data of 24 bits.

The sorting control unit 140 prepares a frequency distribution table shown in FIG. 16B based on the table of FIG. 16A. Since there are three sorting Z-values equal to "7" in FIG. 16A, a frequency 3 is written in a column under "7" in FIG. 16B. Similarly, the other frequencies are written in the respective columns to prepare a frequency distribution table shown in FIG. 16B. Actually, the frequency distribution table will be stored in the frequency distribution table register 144 off the sorting RAM 142 at each register section.

The frequency distribution table is then used to prepare a priority table shown in FIG. 16C. Since the priority of the sorting Z-values equal to "6" is equal to 1+2+4=7 as shown in FIG. 16B, this value is written in a column under "6". The priority table thus prepared will actually be stored in the frequency distribution table register 144 at each register section to rewrite the contents of the frequency distribution table register 144.

The sorting control unit 140 again reads out all the same sorting Z-values as previously read out from the data RAM 130. On the reading-out operation, the priority stored in the frequency distribution table register 144 is referred to. If the sorting Z-value of the polygon data is equal to five, the priority of the polygon data becomes "11" from FIG. 16C. Therefore, the sorting control unit 140 writes an address of the corresponding polygon data or address in the data RAM 130 in the index register 146 at the eleventh register section. Similarly, the addresses of the corresponding polygons will be written in the index register 146 at all the register sections, according to the priority table mentioned above.

Finally, the addresses are read out from the index register 146 sequentially starting from the highest priority address. According to the read addresses, the polygon data are read out from the data RAM 130 and outputed toward the image display unit 360. According to the priority determined on the sorting Z-values, the polygon data will be sequentially outputted from the image display unit 360.

(8) Applicable Examples

Figure 12:
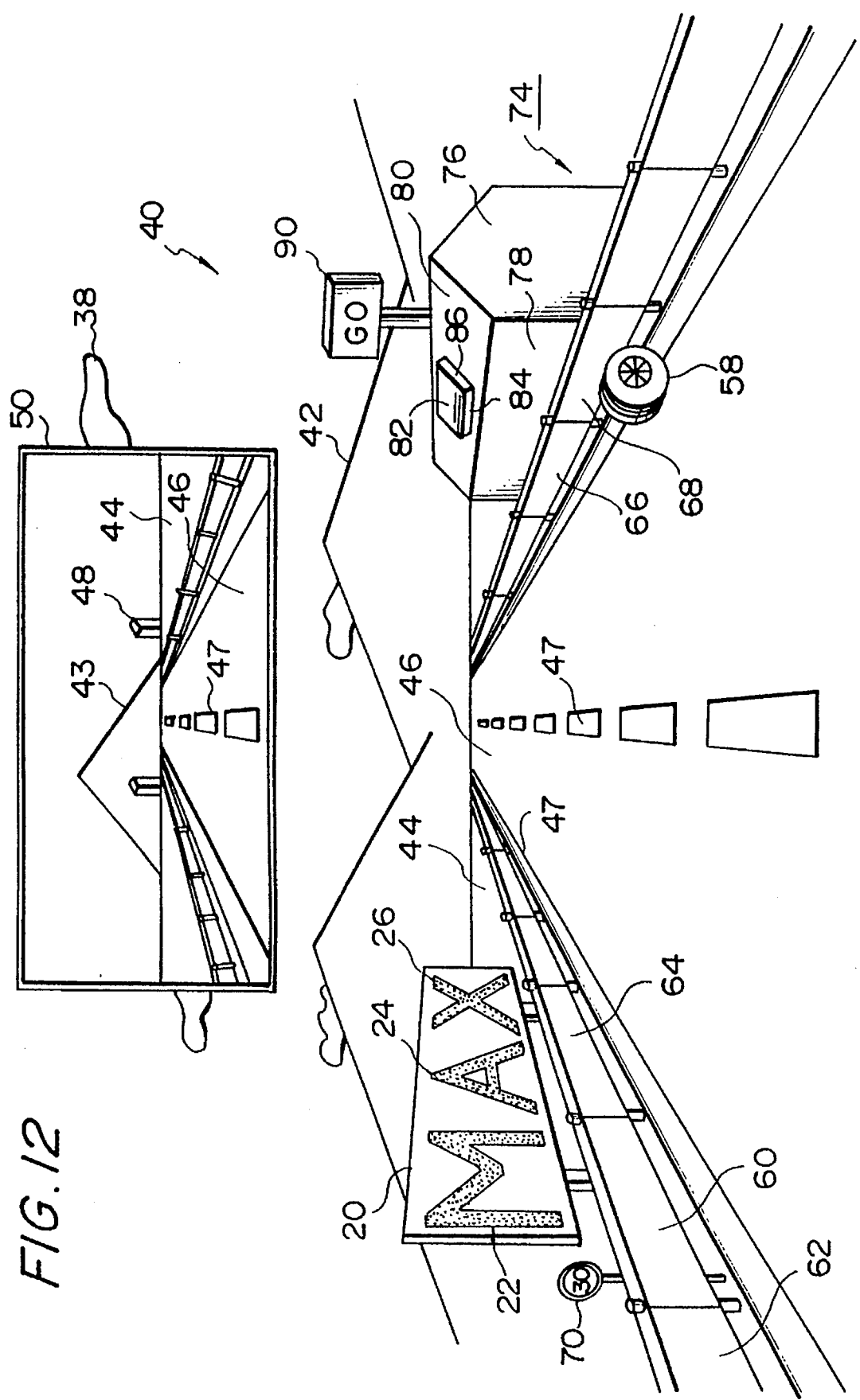
FIG. 12 is a schematic diagram illustrating a scene which is displayed according the present embodiment.

FIG. 12 shows a scene actually displayed in a driving game to which the sorting processing unit according to the first fourth techniques is applied.

(a) Change of Z-Representative Value

Figure 5B:
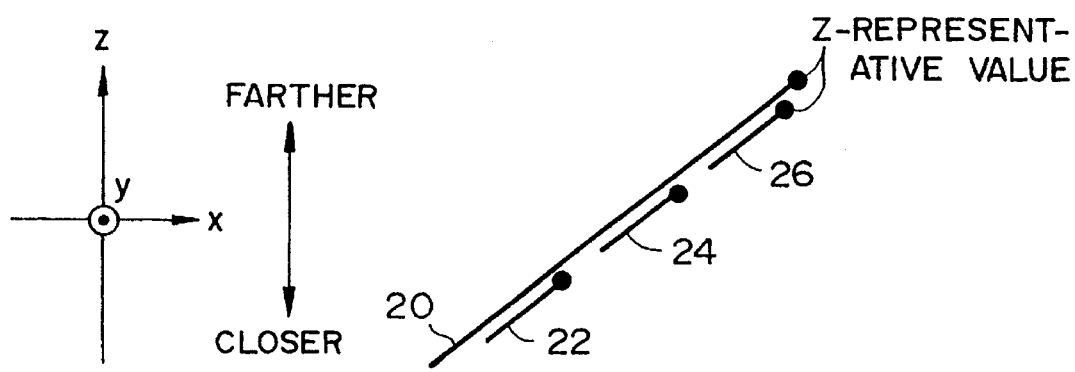
FIG. 5B is a schematic diagram illustrating the first technique.

In FIG. 12, a sign-board 20 and letters 22, 24 and 26 must be displayed so that these letters are always located closer to the player than the sign-board. In such a case, if the Z-representative values of the sign-board and letters are set at "average value", the letter image data may be lost. Therefore, the polygon Z-representative values of the sign-board and letters are set at "maximum value" as shown in FIG. 5B. Thus, the default data can positively be avoided.

Figure 13A:
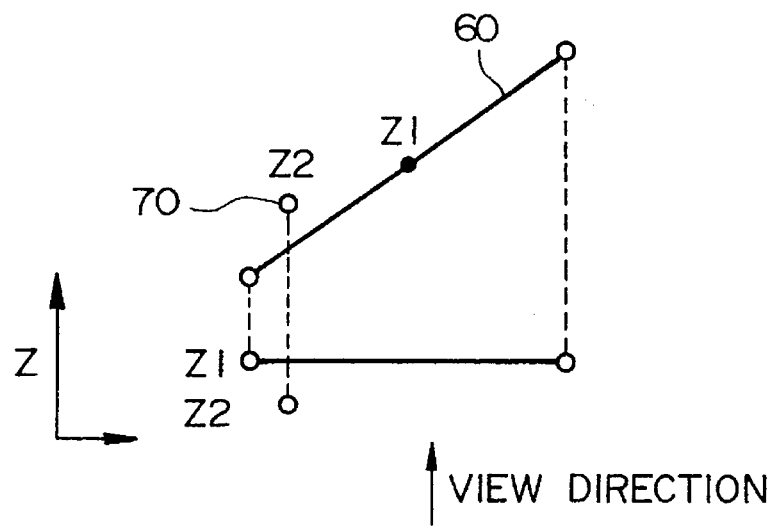
FIGS. 13A and 13B are schematic diagrams illustrating the validity on the Z-representative value change and shift value addition.

It is desirable that the Z-representative value of the polygons defining a guard rail 60 is set at "minimum value". Otherwise, a sign 70 which should be located on the far side of the guard rail 60 as shown in FIG. 12 may be located closer to the player than the guard rail 60. This is shown in FIG. 13A. More particularly, if the Z-representative value Z1 of the guard rail 60 is the "average value", the sign 70 will be located closer to the player from its actually drawn position since the Z-representative value Z2 of the sign 70 is smaller than the value Z1. On the other hand, usually, such a kind of driving game does not substantially locate any other 3-D object at a position closer to the player than the guard rail 60. It is therefore desirable that the Z-representative value of the guard rail 60 is the "minimum value".

It is to be noted that if the Z-representative value of the guard rail 60 is the "minimum value", the Z-representative values of the other guard rails 62, 64, 66 and 68 also become the "minimum value" In such a type of image synthesizing systems, usually, common image data relating to the guard rails 60, 62 and others are used to save the memory capacity of image processing data. More particularly, the polygon data of the guard rail 60 are stored in the 3-D data memory 314 while the image processing step of the other guard rails 62, 64 and etc. also uses the same stored image data as common image data. Data used to select and set any one of the "maximum value", "minimum value" and "average value" as a Z-representative value are also included in this common data. If the Z-representative value of the guard rail 60 is set to be the "minimum value", therefore, the Z-representative values of the other guard rails 62, 64, 66 and 68 will also be necessarily set to be the "minimum value". This raises a problem in the relationship between the guard rail 68 and such a tire 58 as shown in FIG. 12.

(b) Shift Value Addition for Every Polygon

The tire 58 shown in FIG. 12 may be one that in the driving game, is separated from a crushed racing car and rolled forward the guard rail. In such a case, the tire 58 will impact against the guard rail 68 and bounces. If the Z-representative value of the guard rail 68 is set at the "minimum value", however, the following disadvantage will be produced.

Figure 13B:
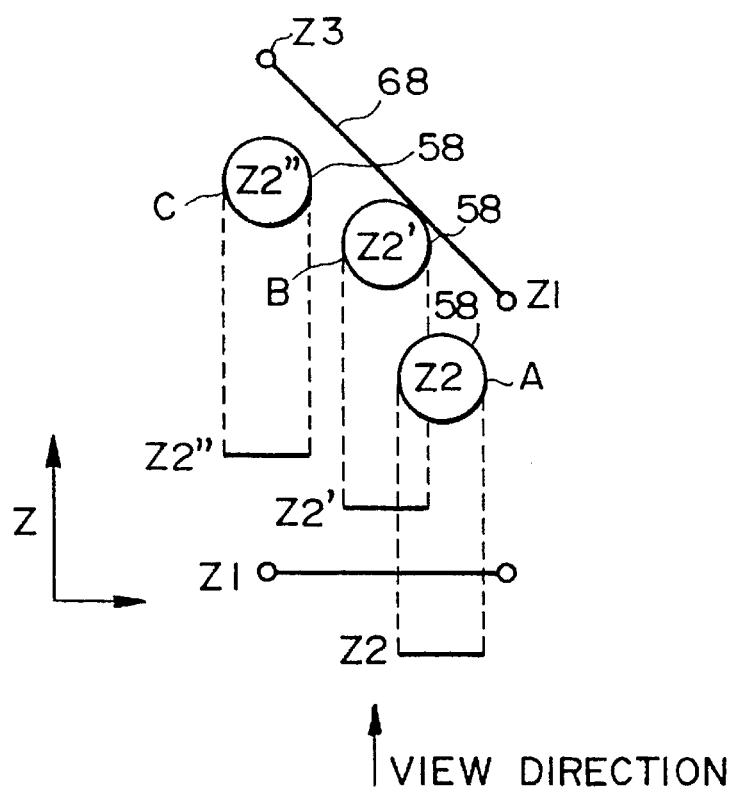

In FIG. 13B, the tire 58 moves following such a path as shown by A, B and C under the impacting and bouncing relative to the guard rail 68. It is now assumed that the Z-representative value of the guard rail 68 is Z1 and the Z-representative value of the tire 58 is Z2. If the tire 58 is in the position A, there is no problem since Z2<Z1. If the tire 58 is in the position B, the tire 58 will be hidden behind the guard rail 68 since Z2'>Z1. If the tire is in the position C, the tire 58 remains hidden by the guard rail 68 since Z2">Z1. Thus, the drawing of the tire which impacts against the guard rail 68 and bounces can not be carried out.

To avoid such a problem, a negative shift value is added to the Z-representative value of the tire 58. More particularly, if the minimum Z-value in the polygon vertices of the guard rail 68 is Z3, a negative shift value larger than (Z3–Z1) may be added to the Z-representative value. In such a manner, the tire can clearly be drawn when it impacts against the guard rail 68 and bounces.

It is to be noted herein that only the Z-representative value is changed without any influence against the other data such as the actual Z-coordinates of the tire 58 and so on. Even though a very large Z-representative value is added, the displayed image will not adversely be affected unless the priority of a 3-D object located closer to the player than the tire 58 is disturbed.

In this case, it is not preferred that a positive shift value is added to the Z-representative value of the guard rail 68. This is because the addition of positive shift value results in setting of such a positive shift value to the sorting control data shown in FIG. 10A. However, the sorting control data of FIG. 10A will influence all the guard rails since it is common to all the polygons defining the guard rails. As a result, the sign 70 may be located closer to the player than the guard rail 60 in displayed image.

Such an addition of shift value to each polygon is effective in regulating the Z-representative value of a house 74 which has a protruding member (which will be referred to "box member") on the roof of the house as shown in FIG. 12.

The roof 80 of the house is formed by a relatively large polygon. This is because unlike the prior art in which if the roof was formed by a plurality of roof tiles, the roof would be divided into a plurality of polygons representing the roof tiles, the texture mapping technique can simply draw such a roof by applying textures representing the roof tiles onto the roof. As a result, the polygon representing the roof will be necessarily increased in size.

If the box member on the large polygon 80 is formed by polygons 82, 84 and 86 (and polygons representing the other non-visual parts being omitted), the priority of the polygons 82, 84 and 86 relative to the polygon 80 will be disturbed depending on the direction of view. As a result, the box member will appear or disappear depending on the direction of view. The respective polygons 82, 84 and 86 will disappear in the different manners.

To avoid such a problem, a negative shift value is added to the Z-representative value of each of the polygons 82, 84 and 86 to correct the disturbed priority thereof. In such a manner, the polygons 82, 84 and 86 can always be located closer to the player than the polygon 80 in displayed image even if the direction of view is changed.

In this case, the optimum shift value of a polygon is different from those of the other polygons. More particularly, if too large negative shift value is added to the Z-representative value of a polygon and if the other polygons are located closer to the player than the box member (e.g., in a case when a bird moves above and past the box member), the priority of the polygons will be disturbed. To avoid such a disadvantage, it is required to add the optimum shift value to each polygon. This means that different shift values must be added to the respective polygons.

(c) Shift Value Addition for Every 3-D Object

The priority relationship between the house 74 and the guard rail 66 will next be considered. In this case, it is required that the house 74 is necessarily located on the far side of the guard rail 66 even if the house 74 is viewed in any direction. If the Z-representative values of the polygons of the house 74 are set at the "minimum value" or "average value", however, the guard rail 66 will disappear into the polygon 78 depending on the direction of view.

If the Z-representative values of the polygons of the house 74 are set at the "maximum value", the priority relationship between the house 74 and a sign-board 90 will be disturbed. It is also not preferred that only the Z-representative value of the polygon 78 is set at the "minimum value" since it adversely affect the priority relationship between the polygon 78 and the other polygons 76, 80.

As described, the priority relationship between the polygon 80 and the polygons 82, 84 and 86 is regulated by adding a shift value to each of the polygons 82, 84 and 86. It is therefore required that the priority relationship between the entire house 74 and the guard rails 66, 68 and sign-board 90 is regulated without disturbance of the priority relationship between the polygon 80 and the polygons 82, 84 and 86.

It is thus desirable that the same shift value is added to all the polygons defining the house 74. Thus, the present embodiment deals with such a problem by adding the same shift value to the house 74 which is a 3-D object, in a 3-D object unit. If the same shift value is added to the sign-board 90, the priority relationship between the house 74 and the sign-board 90 will be maintained properly. The shift value added to the Z-representative value of the house polygon 74 may be a positive shift value corresponding to the length of the guard rails if it is wanted to maintain the priority relationship between the house 74 and the guard rails 66 and 68.

(d) Setting of Fixed Z-Value

Figure 14:
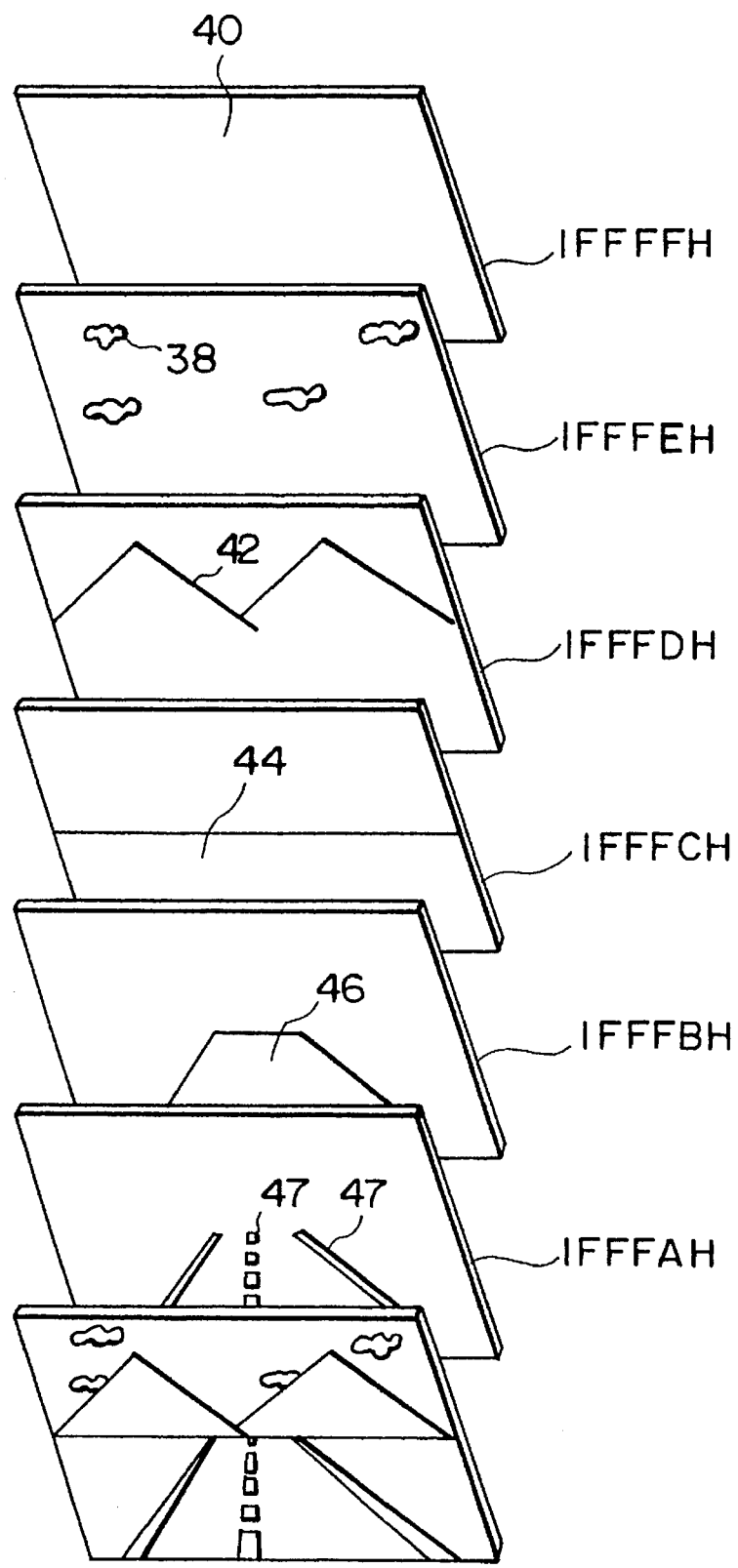
FIG. 14 is a schematic diagram illustrating the concept of the fixed Z-value setting.

FIG. 14 shows the concept of a background drawn by setting the fixed Z-values. As shown in FIG. 14, the fixed Z-values are used and set to draw the background containing the sky 40, clouds 38, mountains 42, the ground 44, road 46 and white lines 47 so that these background images will be located farther from the player than the normal objects. To provide the order of the sky 40, clouds 38, mountains 42, the ground 44, road 46 and white lines 47 as described, the fixed Z-values of 21 bits shown in FIG. 10B are set to be, for example, 1FFFFH for a polygon representing the sky 40; 1FFFEH for polygons representing the clouds 38; 1FFFDH for polygons representing the mountains 42; 1FFFCH for a polygon representing the ground 44; 1FFFBH for a polygon representing the road 46; and 1FFFAH for polygons representing the white lines 47. By setting the fixed Z-values at relatively large values, the priority relationship between these background polygons and the other 3-D objects, for example, between the background polygons and the sign-board 20, guard rail 60, house 74 and other objects in the displayed scene can simply be regulated.

(e) Setting of Absolute Priority

As shown in FIG. 12, the setting of absolute priority can draw the polygons of buildings 48, mountains 43 and others in the window 50 at absolute positions that are closer to the player than the other polygons out of that window. More particularly, the three high-order bits of the sorting Z-values are set at (000) for the polygons within the window and at (001) for the polygons out of the same The polygons within the window 50 also can be located closer to the player than the other polygons out of the window, for example, by setting the fixed Z-values. However, the setting absolute priority enables the priority control due to the setting of fixed Z-value and the shift value addition independently within the window 50. This can control the priority more simply with a higher precision than by only the fixed Z-values.

(f) Shift Value Addition for Absolute Priority

Figure 17A:
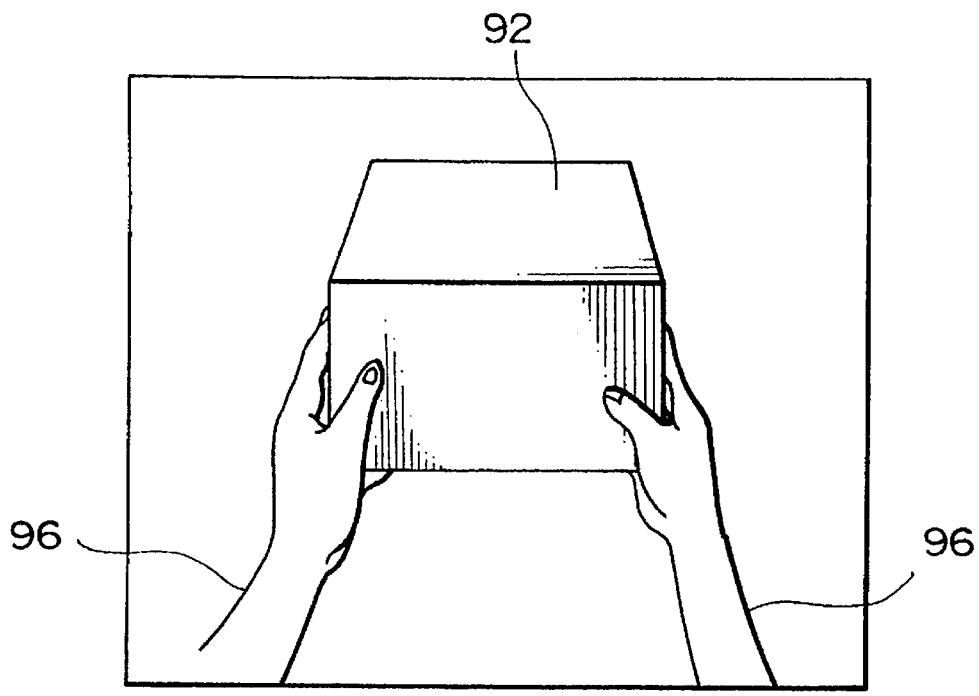
FIGS. 17A and 17B are schematic diagrams illustrating an addition of shift value to the absolute priority bit.
Figure 17B:
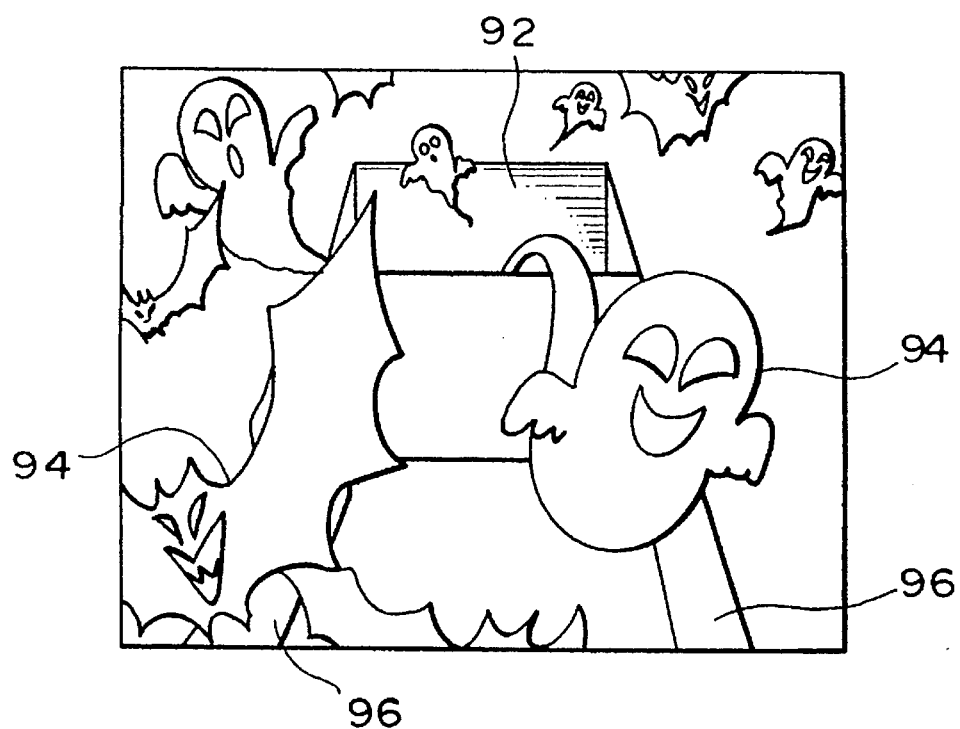
Figure 18:
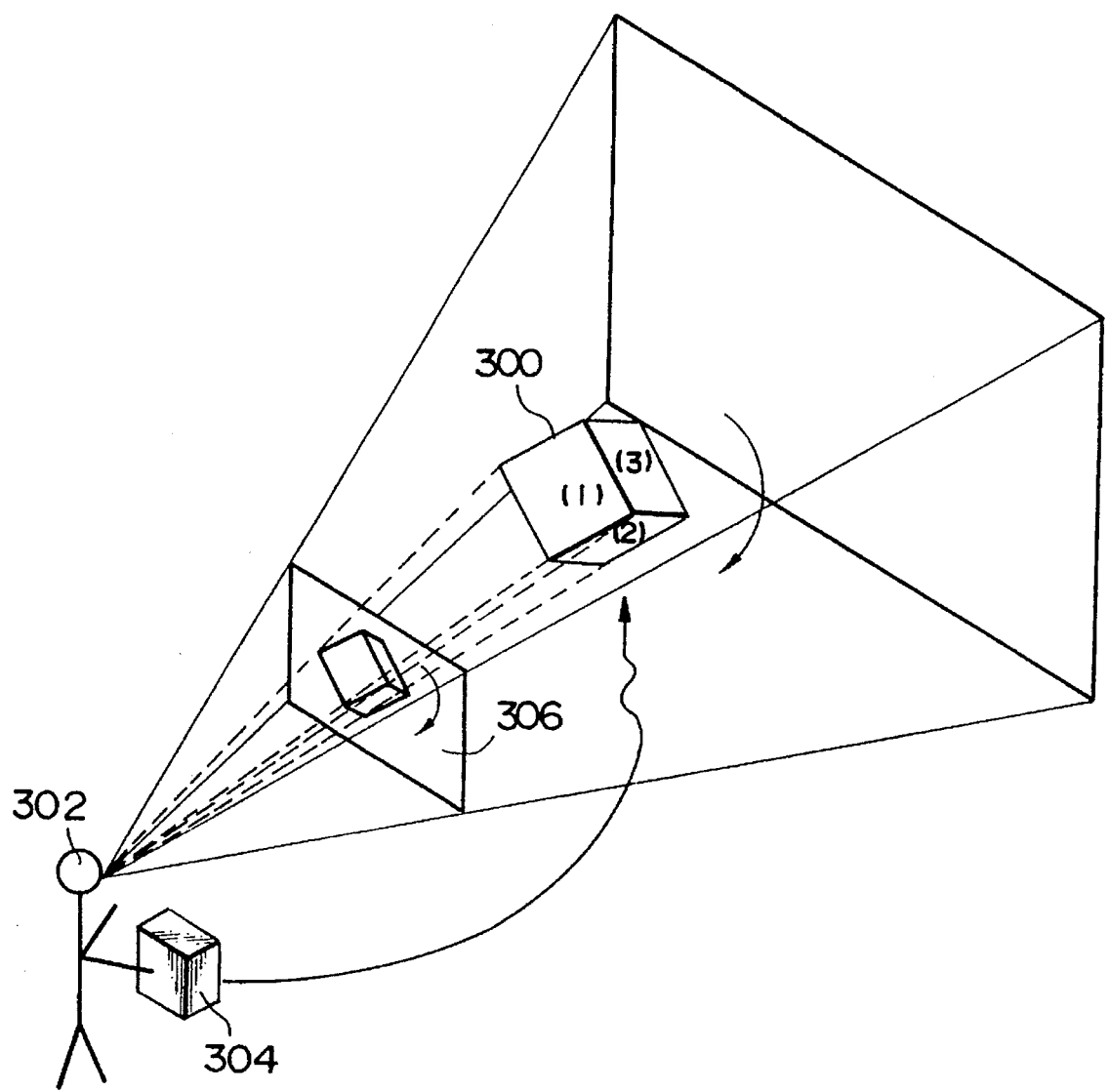
FIG. 18 is a schematic diagram illustrating an image synthesizing system constructed in accordance with the prior art.
Figure 19:
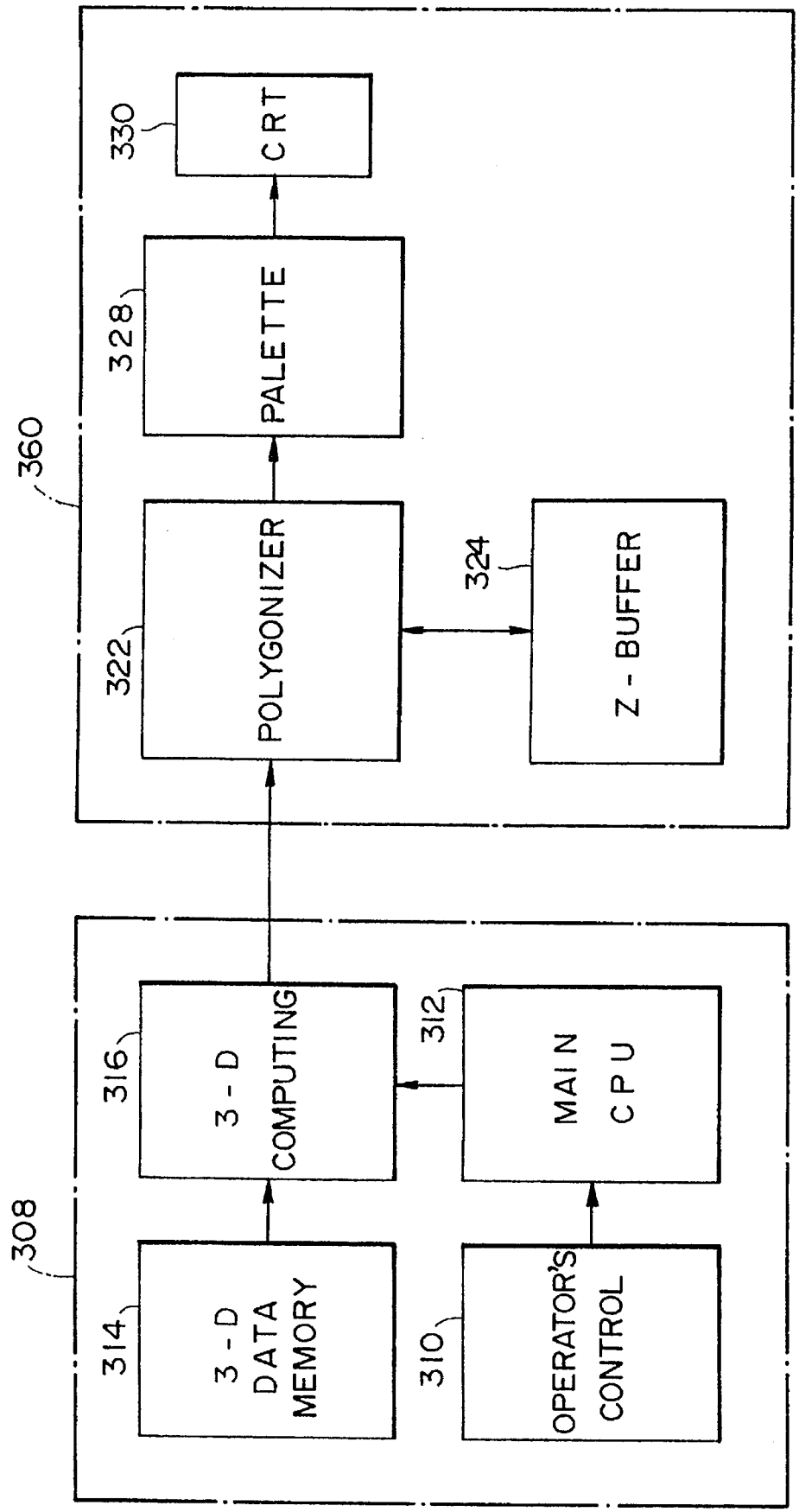
FIG. 19 is a schematic block diagram of the layout in the image synthesizing system of the prior art.
Figure 20A:
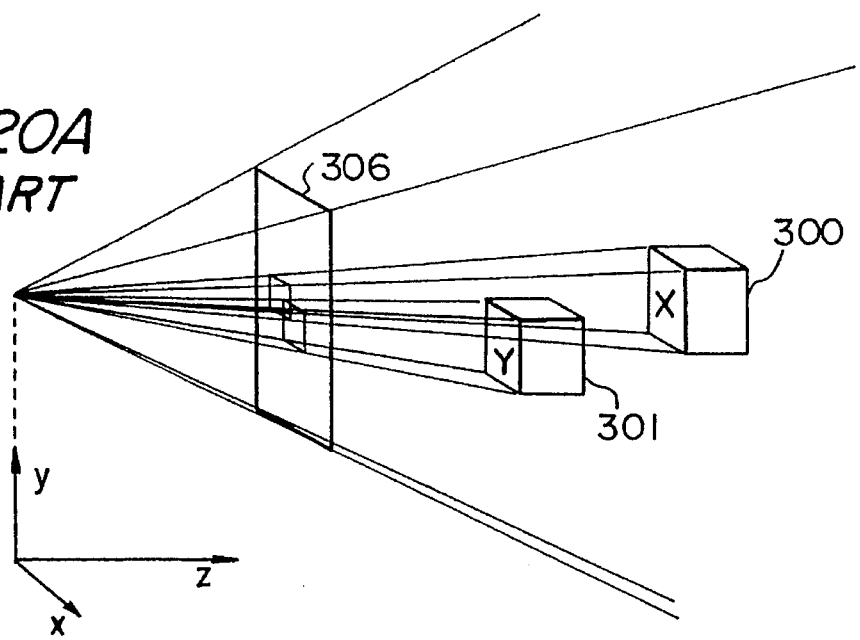
FIGS. 20A and 20B are schematic diagrams illustrating the Z-buffer technique used in the image synthesizing system of the prior art.
Figure 20B:
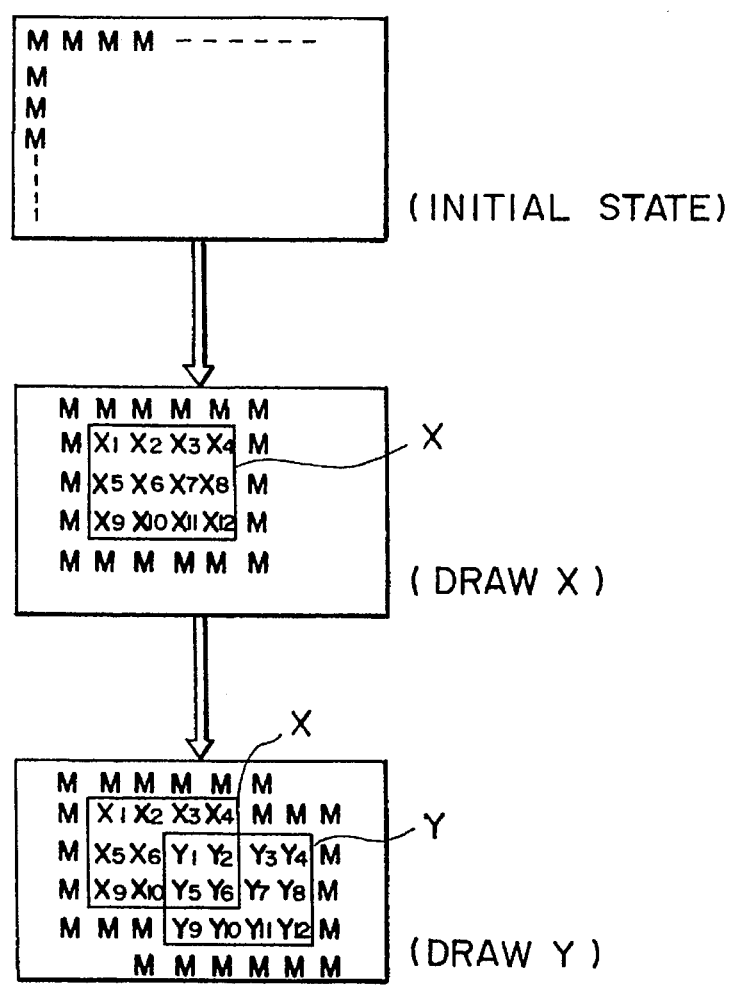

FIGS. 17A and 17B show an example in which the shift value addition for absolute priority is effective and also a displayed scene in a role playing game utilizing a virtual reality system to which the image synthesizing system and sorting processing system of the present invention are applied.

A goggle-shaped headgear is mounted on the head of the player. The headgear has an image reproducing device which is positioned over the player's eyes. This game is such that the player having the head gear mounted thereon searches treasures in a labyrinth. The image synthesizing system of the present invention uses a space sensor attached to the player to detect the position and visual field direction of the player which are in turn used to compute a scene in the visual field direction of the player and to transfer the computed scene to the image reproducing device. Images and enemy characters in the labyrinth are displayed sequentially over the displayed scene for the player's motion.

The player searches treasures in the labyrinth while beating the enemy characters. When the player finds a treasure box, he or she opens the treasure box. Usually, the treasure boxes contain various weapons, various items, gold coins and others. The player can increase his or her power of weapons, experienced points, etc. by getting the treasures. FIG. 17A shows a scene at which the player just opens a treasure box 92.

To increase the reality of the game with an increased thrill, it is effective to hide new enemy characters 94 in the treasure box, for example. When the enemy characters 94 suddenly appear before the player at a moment when the treasure box is opened by the player as shown in FIG. 17B, the sense of tension in the game can greatly be increased. Since the image reproducing device is mounted on the player's head over his or her eyes as described, an impact against the player will be very large when such a scene is displayed.

As shown in FIG. 17B, it is required to display the enemy characters 94 at a position closest to the player in the scene even if any object such as the player's hand or a weapon held by the player is displayed before the player. Thus, the shift value addition for absolute priority becomes effective. More particularly, a sorting control data having a negative absolute shift value has been set in the polygon data or object data defining the enemy characters 94. Thus, at a moment when the enemy characters 94 are displayed on the displayed scene, it can be automatically displaced at its position closest to the player in the scene. Since this priority is absolutely set, the enemy characters 94 can be properly displayed before the player irrespectively of the position of the player's hand 96 or the weapon held by the player. A superior image effect which would not be provided by the prior art in any way can be realized, for example, in that the player is surprised by the enemy character suddenly appearing on the scene or in that the player's sense of tension is highly increased. Even in such a case, the priority between the enemy characters can be regulated in the same range of absolute priority completely independently.

The present invention is not limited to the aforementioned embodiment thereof, but may be carried out in any other form within the scope of the invention.

For example, the sorting processing system of the present invention is applied not only to the image synthesizing system as shown in FIG. 2, but also to any other type of image synthesizing system. Thus, the present invention may similarly be applied to any other image synthesizing system which does not utilize the texture mapping technique or Gouraud shading technique. The present invention may be applied to all image synthesizing systems which use the so-called polygonizer technique.

Shift value addition, setting of fixed Z-value, setting of absolute priority, and shift value addition for absolute priority which are all operated for every polygon or 3-D object, and setting of Z-representative value may be used in any one of various combination thereof depending on performances required by the applied image synthesizing system. Therefore, the sorting processing system can be realized by setting only Z-representative value or by combining any or all of above settings.

The image synthesizing system to which the sorting processing system of the present invention is applied may be applied not only to the games, but also to various other image synthesizing systems: virtual reality system, flight simulation, driving simulation, attraction facilities used in amusement parks and so on, computer graphics and other applications.

We claim:

1. A sorting processing system for receiving image data relating to a plurality of polygons defining a pseudo 3-D image, for sorting the image data of said polygons based on Z-coordinates which indicate the position of vertices of said polygons in the direction of view point, and for outputting the sorted image data, comprising:

a sorting Z-value setting unit for computing a Z-representative value from the Z-coordinates of the vertices of each polygon and for setting said Z-representative value for every polygon as a sorting Z-value, and a sorting unit for permutating and outputting the polygon image data according to the priority defined by said sorting Z-value, wherein said sorting Z-value setting unit computes said Z-representative value from said Z-coordinates at the vertices in each polygon using a representative value setting pattern selected from a plurality of representative value setting patterns, said representative value setting pattern having been previously specified individually for each polygon for setting said Z-representative value corresponding to the characteristics of each polygon.

2. A sorting processing system as defined in claim 1 wherein said representative value setting pattern used in said sorting Z-value setting unit is a pattern for selecting said Z-representative value from a group consisting of the minimum value of said Z-coordinates, the maximum value of said Z-coordinates and an average value between the minimum and maximum values; a pattern for selecting said Z-representative value from a group consisting of the maximum and average values: a pattern for selecting said Z-representative value from a group consisting of the minimum and average values; or a pattern for selecting said Z-representative value from a group consisting of the maximum and minimum values.

3. A sorting processing system as defined in claim 2 wherein said sorting Z-value setting unit includes a shift value adder unit for one of: adding a predetermined shift value to the computed Z-representative value at each polygon to form the sorting Z-value; adding a predetermined shift value to each of 3-D objects defined by a plurality of polygons to form the sorting Z-value; and adding a predetermined shift value to each polygon and also a predetermined shift value to each 3-D object to form the sorting Z-value.

4. A sorting processing system as defined in claim 3 wherein the sorting Z-value setting unit includes a fixed Z-value setting unit for forming said sorting Z-value by one of: setting the computed Z-representative value at a fixed value for every polygon, setting the computed Z-representative value at a fixed value for every 3-D object defined by a plurality of polygons and setting the computed Z-representative value at a fixed value for every polygon and at another fixed value for every 3-D object.

5. A sorting processing system as defined in claim 4 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

6. A sorting processing system as defined in claim 5 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

7. A sorting processing system as defined in claim 3 wherein the sorting Z-value setting unit includes an absolute priority setting unit for setting an absolute priority bit at the high order bit of the sorting Z-value, and said absolute priority but controls the priority of each polygon independently of the value of the low order bit of the sorting Z-value.

8. A sorting processing system as defined in claim 7 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

9. A sorting processing system as defined in claim 2 wherein the sorting Z-value setting unit includes a fixed Z-value setting unit for forming said sorting Z-value by one of: setting the computed Z-representative value at a fixed value for every polygon, setting the computed Z-representative value at a fixed value for every 3-D object defined by a plurality of polygons and setting the computed Z-representative value at a fixed value for every polygon and at another fixed value for every 3-D object.

10. A sorting processing system as defined in claim 9 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

11. A sorting processing system as defined in claim 10 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

12. A sorting processing system as defined in claim 2 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

13. A sorting processing system as defined in claim 12 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

14. A sorting processing system as defined in claim 1 wherein said sorting Z-value setting unit includes a shift value adder unit for one of: adding a predetermined shift value to the computed Z-representative value at each polygon to form the sorting Z-value, adding a predetermined shift value to each of 3-D objects defined by a plurality of polygons to form the sorting Z-value and adding a predetermined shift value to each polygon and also a predetermined shift value to each 3-D object to form the sorting Z-value.

15. A sorting processing system as defined in claim 14 wherein the sorting Z-value setting unit includes a fixed Z-value setting unit for forming said sorting Z-value by one of: setting the computed Z-representative value at a fixed value for every polygon, setting the computed Z-representative value at a fixed value for every 3-D object defined by a plurality of polygons and setting the computed Z-representative value at a fixed value for every polygon and at another fixed value for every 3-D object.

16. A sorting processing system as defined in claim 15 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

17. A sorting processing system as defined in claim 16 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

18. A sorting processing system as defined in claim 14 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

19. A sorting processing system as defined in claim 18 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

20. A sorting processing system as defined in claim 1 wherein the sorting Z-value setting unit includes a fixed Z-value setting unit for forming said sorting Z-value by one of: setting the computed Z-representative value at a fixed value for every polygon, setting the computed Z-representative value at a fixed value for every 3-D object defined by a plurality of polygons and setting the computed Z-representative value at a fixed value for every polygon and at another fixed value for every 3-D object.

21. A sorting processing system as defined in claim 20 wherein the sorting Z-value setting unit includes an absolute priority setting unit for setting an absolute priority bit at the high order bit of the sorting Z-value, and said absolute priority bit controls the priority of each polygon independently of the value of the low order bit of the sorting Z-value.

22. A sorting processing system as defined in claim 21 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

23. A sorting processing system as defined in claim 1 wherein the sorting Z-value setting unit includes an absolute priority setting unit for setting an absolute priority bit at the high order bit of the sorting Z-value and said absolute priority bit controls the priority of each polygon independently of the value of the low order bit of the sorting Z-value.

24. A sorting processing system as defined in claim 23 wherein the sorting Z-value setting unit includes an absolute priority shifting unit for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for every 3-D object.

25. An image synthesizing system comprising an image supply unit for perspectively transforming a 3-D image represented by a plurality of 3-D polygons onto a 2-D plane at each of polygons corresponding to the 3-D polygons, for computing the image data of polygons defining a pseudo 3-D image, and for outputting the image data which include Z-coordinates indicating the position of vertices of said polygons in the direction of view point and data specifying a representative value setting pattern for setting a sorting Z-representative value corresponding to the characteristics of each of said polygons and a sort processing device for sequentially receiving the image data of the polygons and for sorting and outputting the polygon image data according to the Z-coordinates, comprising:

a sorting Z-value setting unit for computing a Z-representative value, according to each respective representative value setting pattern, selected from a plurality of representative value setting patterns, at each polygon, from the Z-coordinates of the vertices of each polygon, the Z-representative value being set individually for each polygon as a sorting Z-value, and a sorting unit for permutating and outputting the polygon image data according to the priority defined by said sorting Z-value, said sorting Z-value setting unit computing the Z-representative value from the polygon vertex Z-coordinates, using said representative value setting pattern specified by said specifying data.

26. A sorting processing method for receiving image data relating to a plurality of polygons defining a pseudo 3-D image, for sorting the image data of said polygons based on Z-coordinates which indicate the position of vertices of said polygons in the direction of view point, and for outputting the sorted image data, comprising:

a sorting Z-value setting step for computing a Z-representative value from the Z-coordinates of the vertices of each polygon and for setting said Z-representative value for every polygon as a sorting Z-value, and a sorting step for permutating and outputting the polygon image data according to the priority defined by said sorting Z-value, wherein said sorting Z-value setting step computes said Z-representative value from said Z-coordinates at the vertices in each polygon using a representative value setting pattern selected from a plurality of representative value setting patterns, said representative value setting pattern having been previously specified individually for each polygon for setting said Z-representative value corresponding to the characteristics of each polygon.

27. A sorting processing method as defined in claim 26, wherein said sorting Z-value setting step includes a shift value adder step for one of: adding a predetermined shift value to the computed Z-representative value at each polygon to form the sorting Z-value, adding a predetermined shift value to each 3-D object defined by a plurality of polygons to form the sorting Z-value, and adding a predetermined shift value to each polygon and also a predetermined shift value to each 3-D object to form the sorting Z-value.

28. A sorting processing method as defined in claim 26, wherein said sorting Z-value setting step includes a fixed Z-value setting step for forming said sorting Z-value by one of: setting the computed Z-representative value at a fixed value for every polygon, setting the computed Z-representative value at a fixed value for every 3-D object defined by a plurality of polygons and setting the computed Z-representative value at a fixed value for every polygon and at another fixed value for every 3-D object.

29. A sorting processing method as defined in claim 26 wherein said sorting Z-value setting step includes an absolute priority setting step for setting an absolute priority bit at the high order bit of the sorting Z-value, and said absolute priority bit controls the priority of each polygon independently to the low order bit of the sorting Z-value.

30. A sorting processing method as defined in claim 29 wherein said sorting Z-value setting setup includes an absolute priority shifting step for one of: adding a predetermined shift value to the absolute priority bit for every polygon, adding a predetermined shift value to the absolute priority bit for every 3-D object defined by a plurality of polygons and adding a predetermined shift value to the absolute priority bit for every polygon and another predetermined shift value to the absolute priority bit for each 3-D object.

31. An image synthesizing method comprising an image supply step for perspectively transforming a 3-D image represented by a plurality of 3-D polygons onto a 2-D plane at each of polygons corresponding to the 3-D polygons, for computing the image data of polygons defining a pseudo 3-D image, and for outputting the image data which include Z-coordinates indicating the position of vertices of said polygons in the direction of view point and data specifying a representative value setting pattern for setting a sorting Z-representative value corresponding to the characteristics of each of said polygons and a sort processing step for sequentially receiving the image data of the polygons and for sorting and outputting the polygon image data according the Z-coordinates, comprising:

a sorting Z-value setting step for computing a Z-representative value according to each respective representative value setting pattern, selected from a plurality of representative value setting patterns, at each polygon from the Z-coordinates of the vertices of each polygon, the Z-representative value being set individually for each polygon as a sorting Z-value, and a sorting step for permutating and outputting the polygon image data according to the priority defined by said sorting Z-value, said sorting Z-value setting step computing the Z-representative value from the polygon vertex Z-coordinates, using said representative value setting pattern specified by said specifying data.

* * * * *